United States Patent
Damnjanovic et al.

(10) Patent No.: US 11,611,472 B2
(45) Date of Patent: Mar. 21, 2023

(54) TECHNIQUES FOR ACTIVATING AND DEACTIVATING USER EQUIPMENT RELAYS

(71) Applicant: QUALCOMM incorporated, San Diego, CA (US)

(72) Inventors: Jelena Damnjanovic, Del Mar, CA (US); Tao Luo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 17/187,589

(22) Filed: Feb. 26, 2021

(65) Prior Publication Data

US 2022/0278891 A1    Sep. 1, 2022

(51) Int. Cl.
*H04L 41/0803* (2022.01)
*H04B 7/155* (2006.01)
*H04W 76/30* (2018.01)
*H04W 76/10* (2018.01)
*H04W 72/14* (2009.01)
*H04W 92/18* (2009.01)

(52) U.S. Cl.
CPC ......... *H04L 41/0803* (2013.01); *H04B 7/155* (2013.01); *H04W 72/14* (2013.01); *H04W 76/10* (2018.02); *H04W 76/30* (2018.02); *H04W 92/18* (2013.01)

(58) Field of Classification Search
None
See application file for complete search history.

(56) References Cited

U.S. PATENT DOCUMENTS

| | | | |
|---|---|---|---|
| 2015/0029866 A1* | 1/2015 | Liao | H04W 48/14 370/254 |
| 2016/0338095 A1* | 11/2016 | Faurie | H04W 28/0278 |
| 2017/0317740 A1* | 11/2017 | Basu Mallick | H04B 7/15557 |
| 2018/0027454 A1* | 1/2018 | Martin | H04W 76/14 455/11.1 |
| 2018/0035308 A1* | 2/2018 | Nguyen | H04W 72/1273 |
| 2018/0035354 A1* | 2/2018 | Martin | H04W 40/22 |
| 2018/0049260 A1* | 2/2018 | Aminaka | H04W 8/005 |
| 2018/0054755 A1* | 2/2018 | Lee | H04W 84/04 |
| 2018/0092017 A1* | 3/2018 | Freda | H04W 36/36 |
| 2018/0098370 A1* | 4/2018 | Bangolae | H04W 76/14 |
| 2018/0109990 A1* | 4/2018 | Martin | H04W 8/005 |
| 2018/0124621 A1* | 5/2018 | Jung | H04W 76/14 |

(Continued)

*Primary Examiner* — Jamaal Henson
(74) *Attorney, Agent, or Firm* — Holland & Hart LLP/Qualcomm

(57) ABSTRACT

Methods, systems, and devices for wireless communications are described. A first user equipment (UE) may receive, via a communication link between the first UE and a base station, radio resource control (RRC) signaling which configures a relay communication sidelink for communicating message traffic between the first UE and a second UE for relay to the base station. The first UE may receive a control message via layer one (L1) signaling or layer two (L2) signaling which activates the relay communication sidelink configured by the RRC signaling. The first UE may then communicate, via the relay communication sidelink, a message for relay to or from the base station by the first UE or the second UE based on the control message.

30 Claims, 16 Drawing Sheets

(56) References Cited

U.S. PATENT DOCUMENTS

| | | | |
|---|---|---|---|
| 2018/0152272 A1* | 5/2018 | Chae | H04W 48/12 |
| 2018/0234919 A1* | 8/2018 | Tsuda | H04W 88/04 |
| 2019/0036595 A1* | 1/2019 | Ohtsuji | H04B 7/14 |
| 2019/0158162 A1* | 5/2019 | Ryu | H04B 7/088 |
| 2019/0165848 A1* | 5/2019 | Han | H04W 40/22 |
| 2019/0215701 A1* | 7/2019 | Honglei | H04W 16/28 |
| 2020/0100119 A1* | 3/2020 | Byun | H04W 16/28 |
| 2020/0351839 A1* | 11/2020 | Luo | H04L 5/001 |
| 2021/0297842 A1* | 9/2021 | Shrivastava | H04W 28/24 |
| 2022/0116916 A1* | 4/2022 | Zhao | H04W 72/1289 |

\* cited by examiner

TECHNIQUES FOR ACTIVATING AND DEACTIVATING USER EQUIPMENT RELAYS

FIELD OF TECHNOLOGY

The following relates to wireless communications, including techniques for activating and deactivating user equipment (UE) relays.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for activating and deactivating user equipment (UE) relays. Generally, the described techniques support signaling which may be used to configure, activate, and deactivate relay communications links. In particular, aspects of the present disclosure support signaling over a communication link between a UE and a base station (e.g., Uu link) which may be used to configure a relay communication link between a relay UE and a remote UE, including signaling (e.g., Layer 1 (L1) and Layer 2 (L2) signaling) to activate and deactivate the relay communication link. For example, a first UE (e.g., relay UE, remote UE) may be configured with a relay communication link between the first UE and a second UE via control signaling (e.g., Layer 3 (L3) signaling) from a base station. The relay communication link may be used by one of the UEs to relay communications between the base station and the other respective UE. The relay communication link may then be activated via L1 and/or L2 signaling. Upon activation of the relay communication link, the first UE may communicate with the base station and the second UE using the activated relay communication link.

A method for wireless communication at a first UE is described. The method may include receiving, via a communication link between the first UE and a base station, radio resource control (RRC) signaling which configures a relay communication sidelink for communicating message traffic between the first UE and a second UE for relay to the base station, receiving a control message via L1 signaling or L2 signaling which activates the relay communication sidelink configured by the RRC signaling, and communicating, via the relay communication sidelink, a message for relay to or from the base station based on the control message.

An apparatus for wireless communication at a first UE is described. The apparatus may include a processor, memory coupled with the processor, and instructions stored in the memory. The instructions may be executable by the processor to cause the apparatus to receive, via a communication link between the first UE and a base station, RRC signaling which configures a relay communication sidelink for communicating message traffic between the first UE and a second UE for relay to the base station, receive a control message via L1 signaling or L2 signaling which activates the relay communication sidelink configured by the RRC signaling, and communicate, via the relay communication sidelink, a message for relay to or from the base station based on the control message.

Another apparatus for wireless communication at a first UE is described. The apparatus may include means for receiving, via a communication link between the first UE and a base station, RRC signaling which configures a relay communication sidelink for communicating message traffic between the first UE and a second UE for relay to the base station, means for receiving a control message via L1 signaling or L2 signaling which activates the relay communication sidelink configured by the RRC signaling, and means for communicating, via the relay communication sidelink, a message for relay to or from the base station based on the control message.

A non-transitory computer-readable medium storing code for wireless communication at a first UE is described. The code may include instructions executable by a processor to receive, via a communication link between the first UE and a base station, RRC signaling which configures a relay communication sidelink for communicating message traffic between the first UE and a second UE for relay to the base station, receive a control message via L1 signaling or L2 signaling which activates the relay communication sidelink configured by the RRC signaling, and communicate, via the relay communication sidelink, a message for relay to or from the base station based on the control message.

In some examples of the method, apparatuses, and non-transitory computer-readable medium described herein, receiving the control message may include operations, features, means, or instructions for receiving the control message that includes a grant allocating a resource on the relay communication sidelink for communicating the message between the first UE and the second UE.

Some examples of the method, apparatuses, and non-transitory computer-readable medium described herein may further include operations, features, means, or instructions for transmitting, to the base station, an activation request to activate the relay communication sidelink, where the RRC signaling, the control message, or both, may be received based on transmitting the activation request.

Some examples of the method, apparatuses, and non-transitory computer-readable medium described herein may further include operations, features, means, or instructions for transmitting the activation request based on one or more trigger conditions for activating the relay communication sidelink being satisfied.

Some examples of the method, apparatuses, and non-transitory computer-readable medium described herein may further include operations, features, means, or instructions for receiving, via the RRC signaling, an indication of the one or more trigger conditions.

Some examples of the method, apparatuses, and non-transitory computer-readable medium described herein may further include operations, features, means, or instructions for transmitting, to the base station, a deactivation request to deactivate the relay communication sidelink and receiving, in response to the deactivation request, a second control message which deactivates the relay communication sidelink.

In some examples of the method, apparatuses, and non-transitory computer-readable medium described herein, the relay communication sidelink may be in a deactivated state and the method, apparatuses, and non-transitory computer-readable medium may include further operations, features, means, or instructions for receiving, via the control message, an indication to transition the relay communication sidelink from the deactivated state to an activated state.

Some examples of the method, apparatuses, and non-transitory computer-readable medium described herein may further include operations, features, means, or instructions for determining a first set of parameters associated with the activated state of the relay communication sidelink and a second set of parameters associated with the deactivated state of the relay communication sidelink, where communicating the message via the relay communication sidelink may be based on the first set of parameters.

Some examples of the method, apparatuses, and non-transitory computer-readable medium described herein may further include operations, features, means, or instructions for receiving, via the RRC signaling, an indication of the first set of parameters, the second set of parameters, or both.

Some examples of the method, apparatuses, and non-transitory computer-readable medium described herein may further include operations, features, means, or instructions for determining a first set of one or more parameters associated with the communication link between the first UE and the base station, a second set of one or more parameters associated with the first UE, or both and determining that one or more trigger conditions for activating or deactivating the relay communication sidelink may be satisfied based on the first set of one or more parameters, the second set of one or more parameters, or both.

In some examples of the method, apparatuses, and non-transitory computer-readable medium described herein, and the method, apparatuses, and non-transitory computer-readable medium may include further operations, features, means, or instructions for where the first set of one or more parameters associated with the communication link includes a latency, a throughput, a channel quality indicator (CQI), or any combination thereof and where the second set of one or more parameters associated with the first UE includes a power consumption level, a battery level, or both.

Some examples of the method, apparatuses, and non-transitory computer-readable medium described herein may further include operations, features, means, or instructions for determining a beam management configuration associated with the relay communication sidelink, where the message may be communicated via the relay communication sidelink based on a beam selected in accordance with the beam management configuration.

Some examples of the method, apparatuses, and non-transitory computer-readable medium described herein may further include operations, features, means, or instructions for receiving, via the RRC signaling, information associated with the beam management configuration, where determining the beam management configuration may be based on the RRC signaling.

In some examples of the method, apparatuses, and non-transitory computer-readable medium described herein, the beam management configuration includes a set of one or more parameters for selecting a beam associated with the relay communication sidelink, the set of one or more parameters including a type of beam selection measurements, a frequency of beam selection measurement, one or more parameters for updating transmission-configuration indicator (TCI) states associated with the relay communication sidelink, one or more bidirectional forward detection (BFD) parameters, one or more beam failure recovery (BFR) parameters, or any combination thereof.

Some examples of the method, apparatuses, and non-transitory computer-readable medium described herein may further include operations, features, means, or instructions for determining a discontinuous reception (DRX) configuration associated with the first UE, the second UE, or both, where communicating the message via the relay communication sidelink may be based on the identified DRX configuration.

In some examples of the method, apparatuses, and non-transitory computer-readable medium described herein, the RRC signaling includes the control message.

Some examples of the method, apparatuses, and non-transitory computer-readable medium described herein may further include operations, features, means, or instructions for communicating a second message via a sidelink communication link between the first UE and the second UE, where the sidelink communication link may be different from the relay communication sidelink.

In some examples of the method, apparatuses, and non-transitory computer-readable medium described herein, the control message may be received via the communication link between the first UE and the base station, via a sidelink communication link between the first UE and the second UE, or both.

In some examples of the method, apparatuses, and non-transitory computer-readable medium described herein, communicating the message via the relay communication sidelink may include operations, features, means, or instructions for receiving the message relayed to the first UE by the second UE via the relay communication sidelink, or transmitting the message to the second UE via the relay communication sidelink for relay to the base station.

In some examples of the method, apparatuses, and non-transitory computer-readable medium described herein, communicating the message via the relay communication sidelink may include operations, features, means, or instructions for receiving the message from the base station and relaying the message to the second UE via the relay communication sidelink, or receiving the message from the second UE via the relay communication sidelink and relaying the message to the base station.

A method for wireless communication at a base station is described. The method may include transmitting, via a communication link between the base station and a first UE, RRC signaling which configures a relay communication sidelink for communicating message traffic between the first UE and a second UE for relay to the base station, transmitting a control message via L1 signaling or L2 signaling which activates the relay communication sidelink configured by the RRC signaling, and communicating, via the relay communication sidelink, a message for relay to or from one of the first UE or the second UE by the other of the first UE or the second UE based on the control message.

An apparatus for wireless communication at a base station is described. The apparatus may include a processor, memory coupled with the processor, and instructions stored in the memory. The instructions may be executable by the processor to cause the apparatus to transmit, via a communication link between the base station and a first UE, RRC signaling which configures a relay communication sidelink for communicating message traffic between the first UE and a second UE for relay to the base station, transmit a control message via L1 signaling or L2 signaling which activates the relay communication sidelink configured by the RRC signaling, and communicate, via the relay communication sidelink, a message for relay to or from one of the first UE or the second UE by the other of the first UE or the second UE based on the control message.

Another apparatus for wireless communication at a base station is described. The apparatus may include means for transmitting, via a communication link between the base station and a first UE, RRC signaling which configures a relay communication sidelink for communicating message traffic between the first UE and a second UE for relay to the base station, means for transmitting a control message via L1 signaling or L2 signaling which activates the relay communication sidelink configured by the RRC signaling, and means for communicating, via the relay communication sidelink, a message for relay to or from one of the first UE or the second UE by the other of the first UE or the second UE based on the control message.

A non-transitory computer-readable medium storing code for wireless communication at a base station is described. The code may include instructions executable by a processor to transmit, via a communication link between the base station and a first UE, RRC signaling which configures a relay communication sidelink for communicating message traffic between the first UE and a second UE for relay to the base station, transmit a control message via L1 signaling or L2 signaling which activates the relay communication sidelink configured by the RRC signaling, and communicate, via the relay communication sidelink, a message for relay to or from one of the first UE or the second UE by the other of the first UE or the second UE based on the control message.

In some examples of the method, apparatuses, and non-transitory computer-readable medium described herein, transmitting the control message may include operations, features, means, or instructions for transmitting the control message that includes a grant allocating a resource on the relay communication sidelink for communicating the message between the first UE and the second UE.

Some examples of the method, apparatuses, and non-transitory computer-readable medium described herein may further include operations, features, means, or instructions for receiving, from the first UE, an activation request to activate the relay communication sidelink, where the RRC signaling, the control message, or both, may be transmitted based on receiving the activation request.

Some examples of the method, apparatuses, and non-transitory computer-readable medium described herein may further include operations, features, means, or instructions for receiving the activation request based on one or more trigger conditions for activating the relay communication sidelink being satisfied.

Some examples of the method, apparatuses, and non-transitory computer-readable medium described herein may further include operations, features, means, or instructions for transmitting, via the RRC signaling, an indication of the one or more trigger conditions.

Some examples of the method, apparatuses, and non-transitory computer-readable medium described herein may further include operations, features, means, or instructions for receiving, from the first UE, a deactivation request to deactivate the relay communication sidelink and transmitting, in response to the deactivation request, a second control message which deactivates the relay communication sidelink.

In some examples of the method, apparatuses, and non-transitory computer-readable medium described herein, the relay communication sidelink may be in a deactivated state and the method, apparatuses, and non-transitory computer-readable medium may include further operations, features, means, or instructions for transmitting, via the control message, an indication to transition the relay communication sidelink from the deactivated state to an activated state.

Some examples of the method, apparatuses, and non-transitory computer-readable medium described herein may further include operations, features, means, or instructions for determining a first set of parameters associated with the activated state of the relay communication sidelink and a second set of parameters associated with the deactivated state of the relay communication sidelink, where communicating the message via the relay communication sidelink may be based on the first set of parameters.

Some examples of the method, apparatuses, and non-transitory computer-readable medium described herein may further include operations, features, means, or instructions for transmitting, via the RRC signaling, an indication of the first set of parameters, the second set of parameters, or both.

Some examples of the method, apparatuses, and non-transitory computer-readable medium described herein may further include operations, features, means, or instructions for determining a first set of one or more parameters associated with the communication link between the first UE and the base station, a second set of one or more parameters associated with the first UE, or both and determining that one or more trigger conditions for activating or deactivating the relay communication sidelink may be satisfied based on the first set of one or more parameters, the second set of one or more parameters, or both.

In some examples of the method, apparatuses, and non-transitory computer-readable medium described herein, and the method, apparatuses, and non-transitory computer-readable medium may include further operations, features, means, or instructions for where the first set of one or more parameters associated with the communication link includes a latency, a throughput, a CQI, or any combination thereof and where the second set of one or more parameters associated with the first UE includes a power consumption level, a battery level, or both.

Some examples of the method, apparatuses, and non-transitory computer-readable medium described herein may further include operations, features, means, or instructions for determining a beam management configuration associated with the relay communication sidelink, where the message may be communicated via the relay communication sidelink based on a beam selected in accordance with the beam management configuration.

Some examples of the method, apparatuses, and non-transitory computer-readable medium described herein may further include operations, features, means, or instructions for transmitting, via the RRC signaling, information associated with the beam management configuration, where determining the beam management configuration may be based on the RRC signaling.

In some examples of the method, apparatuses, and non-transitory computer-readable medium described herein, the beam management configuration includes a set of one or more parameters for selecting a beam associated with the relay communication sidelink, the set of one or more parameters including a type of beam selection measurements, a frequency of beam selection measurement, one or more parameters for updating TCI states associated with the relay communication sidelink, one or more BFD parameters, one or more BFR parameters, or any combination thereof.

Some examples of the method, apparatuses, and non-transitory computer-readable medium described herein may further include operations, features, means, or instructions for determining a DRX configuration associated with the first UE, the second UE, or both, where communicating the message via the relay communication sidelink may be based on the identified DRX configuration.

In some examples of the method, apparatuses, and non-transitory computer-readable medium described herein, the RRC signaling includes the control message.

In some examples of the method, apparatuses, and non-transitory computer-readable medium described herein, the control message may be transmitted via the communication link between the first UE and the base station, via a sidelink communication link between the first UE and the second UE, or both.

DETAILED DESCRIPTION

Figure 1:
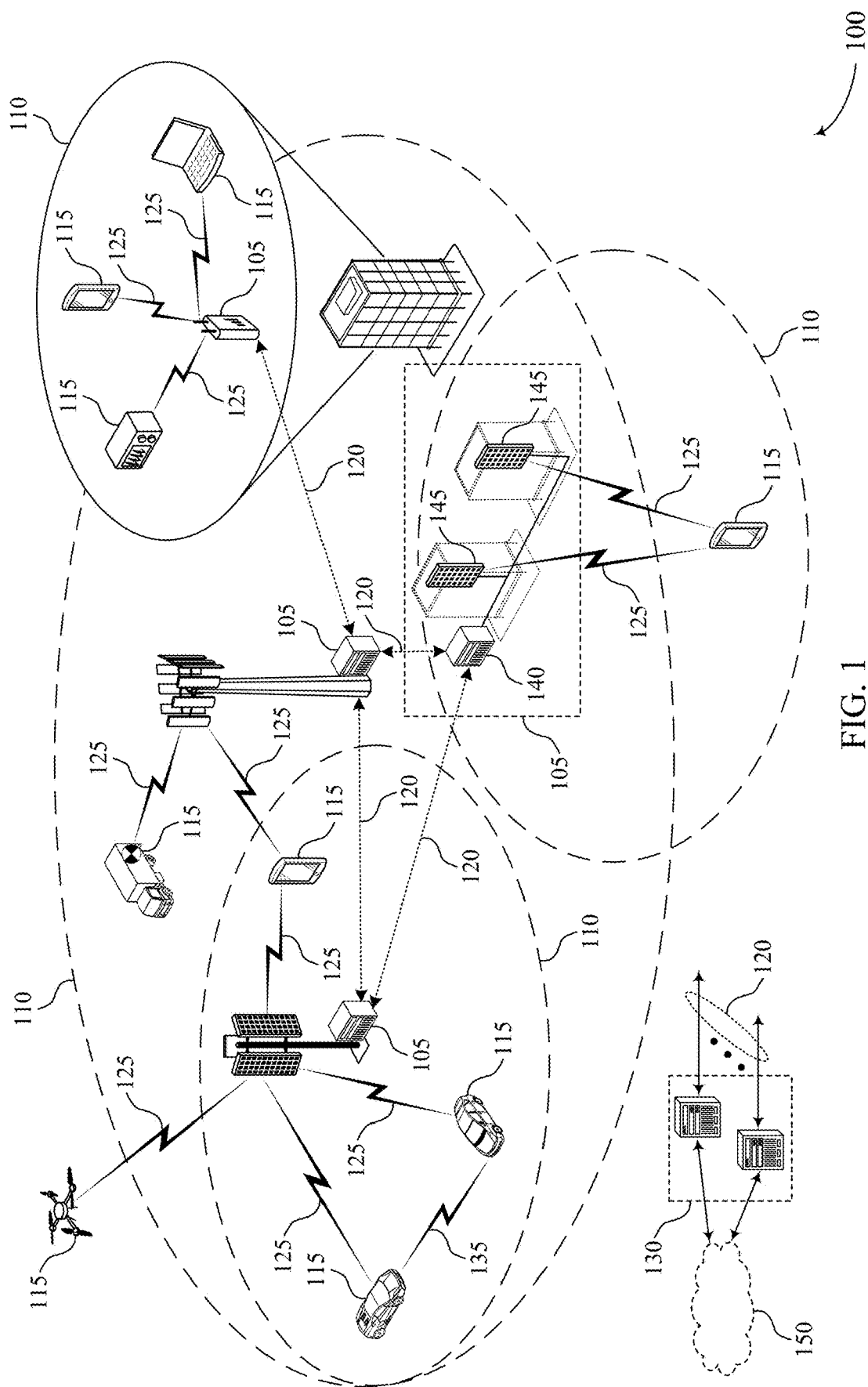
FIG. 1 illustrates an example of a wireless communications system that supports techniques for activating and deactivating user equipment (UE) relays in accordance with aspects of the present disclosure.

Some wireless systems may support communications between the network (e.g., base stations) and user equipments (UEs) (e.g., uplink and downlink communications), as well as communications between multiple UEs (e.g., sidelink communications). In some cases, a communications link between a base station and a UE may become impaired and/or blocked. Higher frequency communications, such as communications in Frequency Range 2 (FR2), may be particularly susceptible to impaired and/or blocked links. Conventional wireless communications systems do not provide any signaling or other mechanisms which may be used to activate and/or deactivate relay communication links between UEs for relaying communications between the UEs for communication with the base station via a communication link between a base station and the respective UEs (e.g., Uu link, an access link, etc.). For example, conventional wireless communications systems do not support signaling over communication links (e.g., Uu links, access links) between the UEs and the base station which may be used to configure, activate, and/or deactivate relay communication links between UEs for relaying messages between the UEs over sidelink and to the base station over a Uu link.

Accordingly, techniques described herein are directed toward signaling which may be used to configure, activate, and deactivate relay communications links. In particular, aspects of the present disclosure may support signaling over a Uu link (e.g., an access link) which may be used to configure a relay communication link between a relay UE and a remote UE, including signaling (e.g., L1, L2 signaling) to activate and deactivate the relay communication link. For example, a first UE (e.g., relay UE, remote UE) may be configured with a relay communication sidelink between the first UE and a second UE via signaling from a base station (e.g., radio resource control (RRC) signaling, L3 signaling). The relay communication sidelink may be used by one of the UEs to relay communications between the base station and the other respective UE. The relay communication sidelink may then be activated via L1 and/or L2 signaling. For example, the relay communication sidelink may be activated via physical layer signaling (e.g., L1 signaling), a MAC or MAC-CE message (e.g., L2 signaling), or any combination thereof. Upon activation of the relay communication sidelink, the first UE may communicate with the base station and the second UE using the activated relay communication sidelink.

Communications over the relay communication sidelink may be used in the alternate to and/or in addition to communications over the Uu link in order to provide coverage enhancement, improve link diversity, and reduce power consumption at the UE. In some cases, communications may be performed between the UE and the base station via both the Uu link and the relay communication sidelink to increase a quantity of data which may be exchanged between the wireless devices (e.g., increase throughput). Additionally or alternatively, duplications (e.g., repetitions) of the same communications may be exchanged between the UE and the base station via the Uu link and the relay communication sidelink in order to increase redundancy and improve a reliability of wireless communications.

In some aspects, the UEs may transmit an activation request and/or a deactivation request in order to trigger an activation or deactivation of the relay communication sidelink. In some cases, the UEs may request activation/deactivation of the relay communication sidelink based on a set of one trigger conditions being satisfied, which may be configured via control signaling from the base station. The set of trigger conditions may indicate rules or parameters specifying if and when the UEs should request activation/deactivation of the relay communication link (e.g., low data throughput over Uu link with base station, high latency over Uu link, low channel quality indicator (CQI) metrics of Uu link, high/low power levels at the UEs). In some aspects, the UEs may be configured with a beam management configuration for the relay communication sidelink, which may define a set of rules or parameters for selecting beams for the relay communication link.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for activating and deactivating UE relays.

FIG. 1 illustrates an example of a wireless communications system 100 that supports techniques for activating and deactivating UE relays in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, a wearable device (e.g., smart watch, smart glasses), and the like. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus-noise ratio (SINR) or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may be configured to support signaling which may be used to configure, activate, and deactivate relay communications links (e.g., relay communication sidelinks). In particular, the wireless communications system 100 may support signaling over Uu links between UEs 115 and base stations 105 which may be used to configure relay communication sidelinks (e.g., communication link 135) between a relay UE 115 and a remote UE 115, including signaling (e.g., L1, L2 signaling) to activate and deactivate the relay communication sidelinks.

For example, a first UE 115 (e.g., relay UE 115, remote UE 115) of the wireless communications system 100 may be configured with a relay communication sidelink (e.g., communication link 135) between the first UE 115 and a second UE 115 via signaling from a base station (e.g., RRC signaling). The signaling may, for example, identify one or more parameters for establishing the relay communication sidelink between the first UE 115 and the second UE 115. The relay communication sidelink may be used by one of the UEs 115 to relay communications between the base station 105 and the other respective UE 115. The relay communication sidelink may then be activated via L1 and/or L2 signaling. Upon activation of the relay communication sidelink, the first UE 115 may communicate with the base station 105 and the second UE 115 using the activated relay communication sidelink.

Communications over the relay communication sidelink may be used in the alternate to and/or in addition to communications over the Uu link in order to provide coverage enhancement, improve link diversity (e.g., improve link selection and/or link aggregation), and reduce power consumption at the UEs 115. In some cases, communications may be performed between a UE 115 and the base station 105 via both the Uu link and the relay communication sidelink to increase a quantity of data which may be exchanged between the wireless devices (e.g., increase throughput). Additionally or alternatively, duplications (e.g., repetitions) of the same communications may be exchanged between the UE 115 and the base station 105 via both the Uu link and the relay communication sidelink in order to increase redundancy and improve a reliability of wireless communications.

In some aspects, the UEs 115 may transmit an activation request and/or a deactivation request in order to trigger an activation or deactivation of the relay communication sidelink. In some cases, the UEs 115 may request activation/deactivation of the relay communication sidelink based on a set of one trigger conditions being satisfied, which may be configured via control signaling (e.g., RRC signaling) from the base station 105. The set of trigger conditions may indicate rules or parameters specifying if and when the UEs 115 should request activation/deactivation of the relay communication sidelink. For example, trigger conditions for activating the relay communication sidelink may include, but are not limited to, low data throughput over Uu link with base station 105, high latency over the Uu link, low CQI metrics of the Uu link, high/low power levels at the UEs 115, and the like. In some aspects, the UEs 115 may be configured with a beam management configuration for the relay communication sidelink, which may define a set of rules or parameters for selecting beams for the relay communication sidelink.

Techniques described herein may enable more efficient configuration and activation of relay communication sidelinks, which may enable more widespread use of relay communication sidelinks between UEs 115. Moreover, by enabling more efficient and widespread use of relay communication sidelinks, techniques described herein may improve link diversity between UEs 115 and base stations 105, thereby facilitating more reliable wireless communications within the wireless communications system 100. Further, improved use of relay communication sidelinks may reduce power consumption at remote UEs 115.

Figure 2:
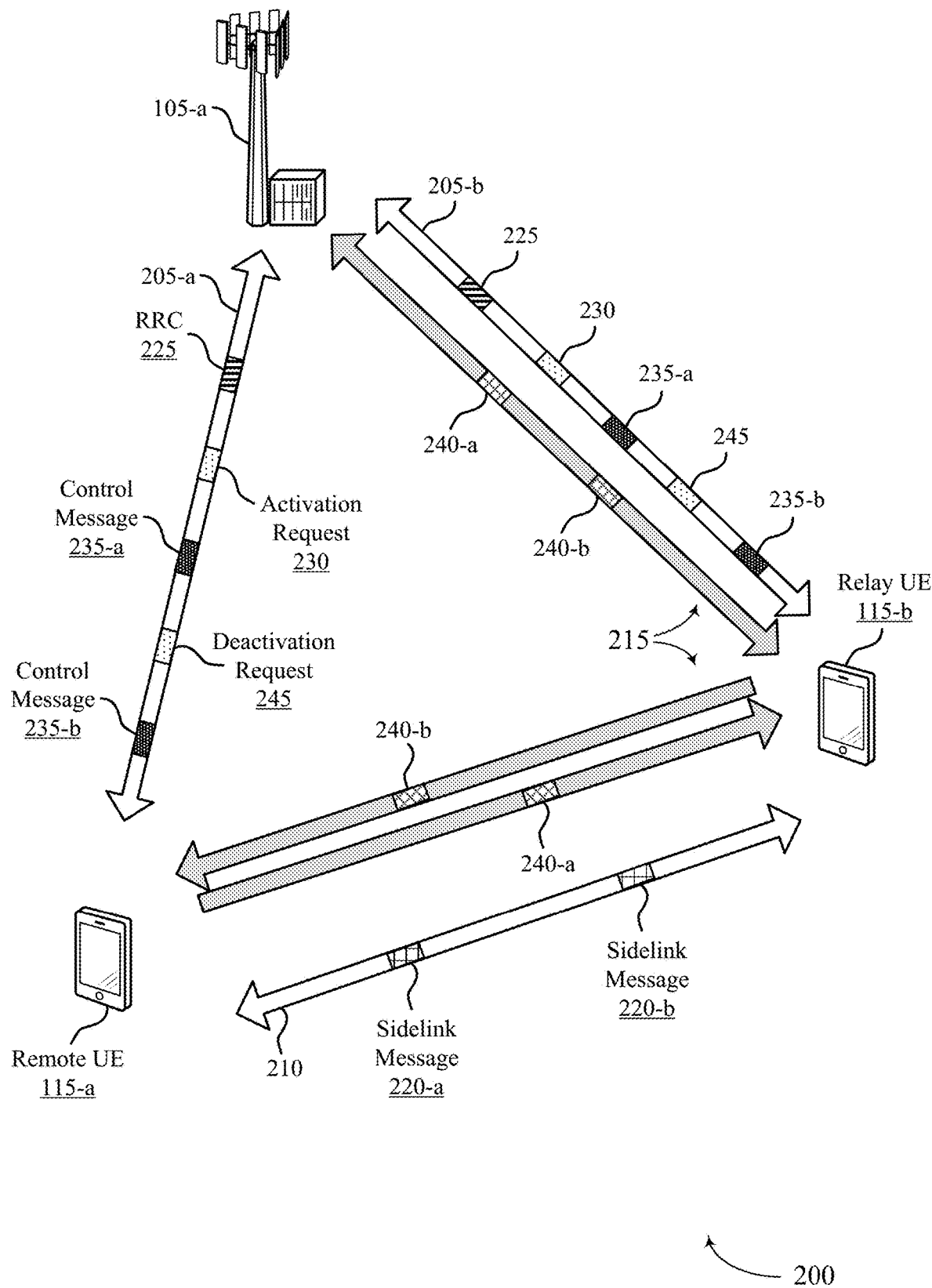
FIG. 2 illustrates an example of a wireless communications system that supports techniques for activating and deactivating UE relays in accordance with aspects of the present disclosure.

FIG. 2 illustrates an example of a wireless communications system 200 that supports techniques for activating and deactivating UE relays in accordance with aspects of the present disclosure. In some aspects, aspects of the wireless communications system 200 may implement, or be implemented by, aspects of the wireless communications system 100. The wireless communications system 200 may include a base station 105-a, a first UE 115-a (e.g., remote UE 115-a), and a second UE 115-b (e.g., relay UE 115-b), which may be examples of UEs 115, base stations 105, and other wireless devices as described with reference to FIG. 1.

The first UE 115-a and the second UE 115-b may communicate with the base station 105-a using communication links 205-a and 205-b, respectively. The communication links 205-a and 205-b may include examples of NR or LTE links between the UEs 115 and the base station 105-a. In some cases, the communication links 205-a and 205-b may include examples of access links (e.g., Uu links) which may include bi-directional links which enable both uplink and downlink communication. For example, the first UE 115-a may transmit uplink signals, such as uplink control signals or uplink data signals, to the base station 105-a using the communication link 205-a, and the base station 105-a may transmit downlink signals, such as downlink control signals or downlink data signals, to the first UE 115-a using the communication link 205-a.

In some aspects, the first UE 115-a and the second UE 115-a may communicate with one another via a communication link 210. The communication link 210 may include an example of a sidelink communication link or PC5 link between the first UE 115-a and the second UE 115-b. As such, the communication link 210 may be based on a PC5 interface between the UEs 115. Additionally, or alternatively, the communication link 210 may be based on other interfaces or wireless communications, including Wi-Fi, Bluetooth, and the like.

As such, the UEs 115 may be configured to communicate in a dual-connectivity mode which facilitates communications with multiple wireless devices (e.g., multiple wireless nodes). For example, the first UE 115-a may operate in a dual connectivity mode including two simultaneous communication stacks (e.g., PHY-to-RLC communication stacks) and a common PDCP. In particular, the first UE 115-a may communicate using a first communication stack for the communication link 205-a with the base station 105-a and a second communication stack for the communication link 210 with the second UE 115-b.

In some aspects, the first UE 115-a, the second UE 115-b, and the base station 105-a may further be communicatively coupled via a relay communication sidelink 215. In some aspects, the second UE 115-b (e.g., relay UE 115-b) may be configured to forward, or relay, wireless communications between the base station 105-a and the first UE 115-a (e.g., remote UE 115-a) via the relay communication sidelink 215. For example, the first UE 115-a may be configured to transmit data to the second UE 115-b via the relay communication sidelink 215, and the second UE 115-b may be configured to forward (e.g., relay) the data received from the first UE 115-a to the base station 105-a via the relay communication sidelink 215. Conversely, the base station 105-a may be configured to transmit data (e.g., downlink signals) to the second UE 115-b via the relay communication sidelink 215, and the second UE 115-a may be configured to forward (e.g., relay) the data received from the base station 105-a to the first UE 115-a via the via the relay communication sidelink 215.

In some aspects, the use of sidelink relays (e.g., relay communication sidelink 215) may enable remote UEs 115 (e.g., first UE 115-a) to reduce a transmission power of uplink transmissions, thereby reducing a power consumption at the remote UEs 115. For example, in cases where the second UE 115-b is closer to the first UE 115-a as compared to the base station 105-a, the first UE 115-a may be able to transmit data to the second UE 115-b for relay to the base station 105-a with a lower transmission power as compared to transmitting data directly to the base station 105-a via the communication link 205. Additionally, the use of sidelink relays (e.g., relay communication sidelink 215) may improve link diversity, which may improve a reliability of wireless communications within the wireless communications system 200. Improved link diversity may be particularly important in the context of higher frequency communications, such as communications in FR2, as Uu links in FR2 may be particularly susceptible to impaired and/or blocked links.

As noted previously herein, conventional wireless communications systems do not provide any signaling or other mechanisms which may be used to activate and/or deactivate relay communication links (e.g., relay communication sidelink 215) between UEs 115 for relaying communications between the UEs 115 for communication with the base station 105 via a communication link between a base station and the respective UEs 115 (e.g., Uu link). For example, conventional wireless communications systems do not support signaling over communication links 205-a and 205-b (e.g., Uu links) between the UEs 115-a and 115-b and the base station 105-a which may be used to configure, activate, and/or deactivate the relay communication sidelink 215 between the UEs 115 for relaying messages between the UEs 115 the base station 105-a.

Accordingly, the UEs 115 and the base station 105-a of the wireless communications system 200 may support signaling which may be used to configure, activate, and deactivate relay communications links (e.g., relay communication sidelink 215). In particular, the wireless communications system 200 may support signaling over the communication links 205-a and 205-b (e.g., Uu links) which may be used to configure the relay communication sidelink 215 between the first UE 115-a and the second UE 115-b, including signaling (e.g., L1, L2 signaling) to activate and deactivate the relay communication sidelink 215. Techniques described herein may enable more efficient and widespread use of relay communication sidelinks 215, which may improve link diversity within the wireless communications system 200, improve a reliability of wireless communications, and reduce power consumption at the first UE 115-a (e.g., remote UE 115-a).

For example, the first UE 115-a and the second UE 115-b may communicate with one another via the communication link 210 (e.g., PC5 link). For instance, the first UE 115-a and the second UE 115-b may exchange (e.g., transmit, receive) a sidelink message 220-a via the communication link 210 (e.g., sidelink communication link 210). As noted previously herein, the communication link 210 used to facilitate communications between the UEs 115 may be different and independent from the relay communication sidelink 215 which is used to facilitate relayed communications between the base station 105-a and the UEs 115.

In some aspects, the base station 105-a may transmit RRC signaling 225 to the first UE 115-a, the second UE 115-b, or both. The UEs 115 may receive the RRC signaling 225 via the communication links 205-a and 205-b (e.g., Uu links) between the base station 105-a and the respective UEs 115. In some aspects, the RRC signaling 225 may configure the relay communication sidelink 215 for communicating message traffic between the first UE 115-a and the second UE 115-b for relay to the base station 105-a. In this regard, the relay communication sidelink 215 may be configured via higher-layer signaling, such as L3 signaling.

In some aspects, the RRC signaling 225 may configure the relay communication sidelink 215 such that it is in initially in a deactivated state. In this regard, the RRC signaling 225 may configure the relay communication sidelink 215 such that it may be activated from the initial deactivated state to an activated state. In some aspects, there may be no transmission or reception of data (e.g., control data) over the relay communication sidelink 215 while the relay communication sidelink 215 is in the deactivated state. Moreover, while the relay communication sidelink 215 is in the deactivated state, the UEs 115 and the base station 105-a may assume that there is no transmission or reception of data and control information (e.g., grants scheduling communications on the relay communication link 215, BSR, power headroom report (PHR), CSI feedback) on the communication links 205 and/or the communication link 210 which is associated with the relay communication link 215. Additionally, or alternatively, the RRC signaling 225 may configure the relay communication sidelink 215 such that it is initially in the activated state. In other words, the relay communication sidelink 215 may be activated at the same time that it is configured.

In some aspects, the RRC signaling 225 may include information associated with the relay communication sidelink 215. Information associated with the relay communication sidelink 215 may include, but is not limited to, trigger conditions for activating and/or deactivating the relay communication sidelink 215, parameters associated with activated/deactivated states of the relay communication sidelink 215, a beam management configuration associated with the relay communication sidelink 215, identifiers associated with wireless devices (e.g., first UE 115-a, second UE 115-b, base station 105-a) associated with the relay communication sidelink 215, and the like.

For example, in some aspects, the RRC signaling 225 may indicate a set of trigger conditions for activating the relay communication sidelink 215. For instance, the RRC signaling 225 may configure the UEs 115 to request activation of the relay communication sidelink 215 if one or more trigger conditions are satisfied. Trigger conditions for activating (or requesting activation of) the relay communication sidelink 215 may be based on characteristics associated with the Uu links (e.g., communication links 205-a, 205-b) between the base station 105-a and the respective UEs 115, characteristics associated with the sidelink communication link 210 between the UEs 115, characteristics at the respective UEs 115, or any combination thereof. For instance, the first UE 115-a may be configured, via the RRC signaling 225, to request activation of the relay communication sidelink 215 based on low data throughput over the communication link 205-a link with base station 105-a, high latency over the communication link 205-a link, low CQI metrics of the communication link 205-a link, high traffic on the communication link 205-a link, high/low power levels at the first UE 115-a, or any combination thereof.

The RRC signaling 225 may additionally or alternatively indicate a set of trigger conditions for deactivating (or requesting deactivation of) the relay communication sidelink 215. Trigger conditions for deactivating (or requesting deactivation of) the relay communication sidelink 215 may also be based on characteristics associated with the communication links 205 between the base station 105-a and the respective UEs 115, sets of resources for communications over the relay communication sidelink 215, characteristics associated with the sidelink communication link 210 between the UEs 115, characteristics at the respective UEs 115, other relay communication sidelinks 215 with other UEs 115, limitations on quantities of supported relay communication sidelinks 215, or any combination thereof.

In some aspects, the first UE 115-a, the second UE 115-b, the base station 105-a, or any combination thereof, may determine parameters associated with the relay communication sidelink 215. In some aspects, the UEs 115 and the base station 105-a may determine the parameters associated with the relay communication sidelink 215 based on transmitting/receiving the RRC signaling 225. For example, the RRC signaling 225 may indicate parameters associated with the relay communication sidelink 215, and the UEs 115 may determine the parameters based on receiving the RRC signaling 225.

In some aspects, parameters associated with the activated and deactivated states of the relay communication sidelink 215 may include, but are not limited to, trigger conditions for activating/deactivating the relay communication sidelink 215, parameters for grants scheduling data/transmissions to be relayed via the relay communication sidelink 215, bidirectional forward detection (BFD) parameters, beam failure recovery (BFR) parameters, CSI feedback parameters, and the like.

For example, the RRC signaling 225 may indicate a first set of parameters associated with the activated state of the relay communication sidelink 215, and a second set of parameters associated with the deactivated state of the relay communication sidelink 215. The first set of parameters associated with the activated state may be different from the second set of parameters associated with the deactivated state. In this example, the UEs 115 may be configured to determine the first set of parameters, the second set of parameters, or both, based on the RRC signaling 225. In additional or alternative implementations, the UEs 115 may be pre-configured with parameters associated with the relay communication sidelink 215.

The first UE 115-a, the second UE 115-b, the base station 105-a, or any combination thereof, may determine a beam management configuration associated with the relay communication sidelink 215. In some aspects, the UEs 115 and the base station 105-a may determine the beam management configuration associated with the relay communication sidelink 215 based on transmitting/receiving the RRC signaling 225, determining the parameters associated with the relay communication sidelink 215, or both.

In some aspects, the beam management configuration may include one or more parameters for selecting a beam associated with the relay communication sidelink 215. In other words, the beam management configuration may include parameters for selecting beams which will be used to transmit/receive information that is conveyed via the relay communication sidelink 215. For example, the parameters associated with the beam management configuration may include a type of beam selection measurements, a frequency of beam selection measurements, parameters for updating transmission-configuration indicator (TCI) states associated with the relay communication sidelink 215, BFD parameters, BFR parameters, or any combination thereof.

In some aspects, the beam management configuration may configure varying levels or degrees of beam management for the activated and deactivated states of the relay communication sidelink 215. In particular, the beam management configuration may configure the respective wireless devices to take a more active role in managing/selecting beams for the relay communication sidelink 215 while the relay communication sidelink 215 is in the activated state as compared to when it is in the deactivated state.

For example, the beam management configuration may indicate a frequency at which the UEs 115 and/or the base station 105-a are to transmit reference signals (e.g., transmit L1 signals) and/or perform beam selection measurements (e.g., L1 measurements) for selecting a beam for the relay communication sidelink 215. In some cases, the beam management configuration may configure the UEs 115 to perform more frequent beam selection measurements when the relay communication sidelink 215 is in the activated state as compared to when the relay communication sidelink 215 is in the deactivated state. Configuring the UEs 115 and/or base station 105-*a* to perform beam selection measurements while the relay communication sidelink 215 is in the deactivated state may enable faster beam selection and activation for the relay communication sidelink 215.

By way of another example, the relay management configuration may configure the UEs 115 and/or the base station 105-*c* to perform beam selection measurements (e.g., L3 measurements) only at a time of activation of the relay communication sidelink 215. In this example, the beam management configuration may not configure the UEs 115 and/or the base station 105-*c* to perform beam selection measurements when the relay communication sidelink 215 is in the deactivated state. Beam management configurations which configure the respective wireless devices from performing beam selection measurements in the deactivated state may enable more power-efficient operation of the relay communication sidelink 215.

In some aspects, the first UE 115-*a*, the second UE 115-*b*, the base station 105-*a*, or any combination thereof, may determine discontinuous reception (DRX) configurations associated with the first UE 115-*a*, the second UE 115-*b*, or both. In some aspects, the UEs 115 and/or the base station 105-*a* may determine the DRX configuration(s) based on performing sidelink communications via the sidelink communication link 210, transmitting/receiving the RRC signaling 225, determining the parameters of the relay communication sidelink 215, determining the beam management configuration of the relay communication sidelink 215, or any combination thereof.

In some aspects, the DRX configurations may include patterns of active durations (ON durations) and inactive durations (OFF durations) at the respective UEs 115. The UEs 115 may be configured to perform communications during the active durations of the respective DRX configurations, and may be configured to enter a sleep state or lower power state in which communications are not performed during the inactive durations of the respective DRX configurations. As such, the inactive durations of the DRX configurations may be associated with lower power consumption at the UEs 115 as compared to the active durations.

In some implementations, the UEs 115 may determine the DRX configurations of each of the UEs 115 so that they may at least partially align the active durations of the respective DRX configurations. For example, the first UE 115-*a* may determine a first DRX configuration at the first UE 115-*a*, and may determine a second DRX configuration at the second UE 115-*b* based on signaling (e.g., sidelink messages 220) received from the second UE 115-*b*. In this example, the first UE 115-*a* and the second UE 115-*b* may selectively adjust the first DRX configuration and/or the second DRX configuration so that a first set of active durations of the first DRX configuration at least partially overlap with a second set of active durations of the second DRX configuration. As such, the UEs 115 may be configured to perform communications over the relay communication sidelink 215 within the portions of the first set of active durations and the second set of active durations which overlap with one another. Moreover, by determining and/or adjusting the DRX configurations at the respective UEs 115, techniques described herein may support more efficient operation of the relay communication sidelink 215 while enabling longer inactive durations of the DRX configurations, thereby improving power savings at the UEs 115.

In some implementations, the first UE 115-*a*, the second UE 115-*b*, the base station 105-*a*, or any combination thereof, may determine parameters associated with the communication links 205 (e.g., Uu links) between the UEs 115 and the base station 105-*a*, parameters associated with the UEs 115 themselves, or both. The UEs 115 and/or the base station 105-*a* may determine the parameters associated with the communication links 205 (e.g., Uu links) and/or the UEs 115 based on performing sidelink communications via the sidelink communication link 210, transmitting/receiving the RRC signaling 225, determining the parameters of the relay communication sidelink 215, determining the beam management configuration of the relay communication sidelink 215, determining the DRX configuration(s) of the UEs 115, or any combination thereof. Additionally, or alternatively, the respective wireless devices may determine the parameters associated with the communication links 205 and/or the UEs 115 based on communications performed between the base station 105-*a* and the UEs 115 over the respective communication links 205.

For example, the first UE 115-*a* and/or the base station 105-*a* may determine a first set of parameters associated with a communication link 205-*a* (e.g., Uu link) between the first UE 115-*a* and the base station 105-*a*. The first set of one or more parameters associated with the communication link 205-*a* may include a latency of the communication link 205-*a*, a throughput of the communication link 205-*a*, traffic performed over the communication link 205-*a*, a CQI metric of the communication link 205-*a* (e.g., RSRP, RSRQ, RSSI, SNR, SINR), or any combination thereof. The first UE 115-*a* and the base station 105-*a* may determine the first set of parameters associated with the communication link 205-*a* based on transmitting/receiving reference signals and other communications via the communication link 205-*a*, and performing measurements on the received signals.

By way of another example, the first UE 115-*a* and/or the base station 105-*a* may determine a second set of one or more parameters associated with the first UE 115-*a*. The second set of parameters associated with the first UE 115-*a* may include a power consumption level at the first UE 115-*a*, a battery level (e.g., power level), a presence (or absence) of an external power source coupled to the first UE 115-*a* (e.g., outlet, battery pack), or any combination thereof.

In some aspects, parameters associated with the UEs 115, parameters associated with the communication links 205 (e.g., Uu links) between the base station 105-*a* and the respective UEs 115, or both, may be used to determine whether the relay communication sidelink 215 is to be activated or deactivated, as will be described in further detail herein.

In some aspects, the first UE 115-*a*, the second UE 115-*b*, the base station 105-*a*, or any combination thereof, may determine whether one or more trigger conditions for activating the relay communication sidelink 215 have been satisfied. In some aspects, the first UE 115-*a*, the second UE 115-*b*, and/or the base station 105-*a* may be configured to initiate and/or request activation of the relay communication sidelink 215, and may therefore be configured to monitor whether the trigger conditions have been satisfied.

The UEs 115 and/or the base station 105-*a* may determine whether trigger conditions for activating the relay communication sidelink 215 have been satisfied based on performing sidelink communications via the sidelink communication link 210, transmitting/receiving the RRC signaling 225, determining the parameters of the relay communication sidelink 215, determining the beam management configuration of the relay communication sidelink 215, determining the DRX configuration(s) of the UEs 115, determining the parameters of the communication links 205 (e.g., Uu links), determining the parameters associated with the UEs 115, or any combination thereof.

For example, the RRC signaling 225 may indicate a trigger condition for activating the relay communication sidelink 215 when a CQI of the communication link between the first UE 115-a and the base station 105-a satisfies a CQI threshold ($CQI_{Thresh}$). In this example, the trigger condition may be satisfied if the CQI is less than or equal to the CQI threshold (e.g., trigger condition satisfied if $CQI \leq CQI_{Thresh}$). In this example, the first UE 115-a, the base station 105-a, or both, may determine that a trigger condition for activating the relay communication sidelink 215 is satisfied based on determining that a CQI of the communication link between the first UE 115-a and the base station 105-a is less than or equal to the CQI threshold.

By way of another example, the RRC signaling 225 may indicate a trigger condition for activating the relay communication sidelink 215 when a battery level ($Batt_{UE}$) of the first UE 115-a satisfies a battery level threshold ($Batt_{Thresh}$). In this example, the trigger condition may be satisfied if the battery level of the first UE 115-a is less than or equal to the battery level threshold (e.g., trigger condition satisfied if $Batt_{UE} \leq Batt_{Thresh}$). In this example, the first UE 115-a, the base station 105-a, or both, may determine that a trigger condition for activating the relay communication sidelink 215 is satisfied based on determining that the battery level at the first UE 115-a is less than or equal to the battery level threshold.

Trigger conditions for activating the relay communication sidelink 215 may be based on parameters of the communication links 205 between the base station 105-a and the respective UEs 115, parameters of the respective UEs 115, parameters of the sidelink communication link 210 between the UEs 115, or any combination thereof. Moreover, activation of the relay communication sidelink 215 may be based on any quantity of trigger conditions being satisfied. For example, in some cases, satisfaction of a single trigger condition may be enough to initiate and/or request activation of the relay communication sidelink 215. In other cases, activation of the relay communication sidelink 215 may be based on satisfaction of multiple trigger conditions. For example, activation of the relay communication sidelink 215 may be based on a first quality ($Q_1$) of the communication link 205-a between the first UE 115-a and the base station 105-a being less than or equal to a first threshold quality (e.g., $Q_1 \leq Q_{1,Thresh}$), as well as a second quality ($Q_2$) of the sidelink communication link being greater than or equal to a second threshold quality (e.g., $Q_2 \geq Q_{2,Thresh}$).

Additionally, or alternatively, the trigger conditions for activating the relay communication sidelink 215 between the first UE 115-a and the second UE 115-b may be based on parameters of other relay communication sidelinks 215 between one of the UEs 115 and another UE 115. For example, the first UE 115-a may be configured to communicate with the base station 105-a via an additional relay communication sidelink 215 with a third UE 115. In this example, a trigger condition for activating the relay communication sidelink 215 with the second UE 115-b may include a quality of the relay communication sidelink 215 with the second UE 115-a exceeding a quality of the additional relay communication sidelink 215.

In some aspects, the first UE 115-a, the second UE 115-a, or both, may transmit an activation request 230 to activate the relay communication sidelink 215. In some aspects, the first UE 115-a, the second UE 115-a, or both, may transmit an activation request 230 via the communication link 205 (e.g., Uu link) between the base station 105-a and the respective UE 115. For example, the first UE 115-a may transmit an activation request 230 to the base station 105-a via the communication link 205-a between the first UE 115-a and the base station 105-a. Similarly, the second UE 115-b may transmit an activation request 230 to the base station 105-a via the communication link 205-b between the second UE 115-b and the base station 105-a.

The UEs 115 may transmit the activation request 230 based on performing sidelink communications via the sidelink communication link 210, receiving the RRC signaling 225, determining the parameters of the relay communication sidelink 215, determining the beam management configuration of the relay communication sidelink 215, determining the DRX configuration(s) of the UEs 115, determining the parameters of the communication links 205-a, 205-b, determining the parameters of the UEs 115, determining whether trigger conditions for the relay communication sidelink 215 have been satisfied, or any combination thereof.

For example, the first UE 115-a may transmit an activation request 230 based on determining that one or more trigger conditions for initiating/requesting activation of the relay communication sidelink 215 are satisfied. In this regard, by transmitting the activation request 230 based on satisfaction of one or more trigger conditions, the UEs 115 may be configured to initiate/request activation of the relay communication sidelink 215 based on detection of issues associated with direct communication links 205-a, 205-b with the base station 105-a (e.g., low CQI, high latency, low throughput, high traffic), power saving needs at the UEs 115 (e.g., low battery levels), high performance of sidelink communications between the UEs 115 (e.g., high quality of communication link 210), and the like.

In some aspects, the base station 105-a may transmit a control message 235-a to the first UE 115-a, the second UE 115-b, or both, where the control message 235-a activates the relay communication sidelink 215. In some aspects, the control message 235-a may be transmitted via L1 signaling (e.g., physical layer signaling), L2 signaling, or both. For example, the control message 235-a may be transmitted via L2 signaling and may include a MAC message (e.g., MAC-CE message). In some implementations, the base station 105-a may transmit the control message 235-a to the first UE 115-a and/or the second UE 115-b via the communication links 205-a, 205-b (e.g., Uu links) between the base station 105-a and the respective UEs 115. In additional or alternative implementations, the base station 105-a may transmit the control message 235-a to the first UE 115-a and/or the second UE 115-b via the relay communication sidelink 215, the sidelink communication link 210 between the respective UEs 115, or both. For example, the base station 105-a may transmit the control message 235-a to the second UE 115-b via the relay communication sidelink 215, and the second UE 115-b may forward (e.g., relay) the control message 235-a to the first UE 115-a via the relay communication sidelink 215.

The UEs 115 may receive, and the base station 105-a may transmit, the control message 235-a activating the relay communication sidelink 215 based on performing sidelink communications via the sidelink communication link 210, transmitting/receiving the RRC signaling 225, determining the parameters of the relay communication sidelink 215, determining the beam management configuration of the relay communication sidelink 215, determining the DRX configuration(s) of the UEs 115, determining the parameters of the communication links 205-a, 205-b, determining the parameters of the UEs 115, determining whether trigger conditions for the relay communication sidelink 215 have been satisfied, transmitting/receiving the activation request 230, or any combination thereof. For example, the base station 105-a may transmit the control message 235-a activating the relay communication sidelink 215 in response to receiving an activation request 230 from the first UE 115-a and/or the second UE 115-b.

In cases where the relay communication sidelink 215 is initially configured in the deactivated state, the control message 235-a may include an indication to transition the relay communication sidelink 215 from the deactivated state to the activated state. In some aspects, the control message 235-a may indicate a set of resources for communications to be performed over the relay communication sidelink 215. For example, the control message 235-a may include a grant allocating a resource on the relay communication sidelink 215 for communicating a message between the first UE 115-a and the second UE 115-b, for communicating the message between the second UE 115-b and the base station 105-a, or both.

The control message 235-a may activate the relay communication sidelink 215. As noted previously herein, the RRC signaling 225 may initially configure the relay communication sidelink 215 in the deactivated state such that it may be subsequently activated via L1/L2 signaling (e.g., the control message 235-a). However, in additional or alternative implementations, the relay communication sidelink 215 may be configured and activated at the same time, via the same control signaling, or both.

For example, in some cases, the RRC signaling 225 or the control message 235-a may both configure and activate the relay communication sidelink 215. For instance, in some cases the control message 235-a may configure and activate the relay communication sidelink 215. In such cases, because the relay communication sidelink 215 is already activated, it may be unnecessary to determine whether trigger conditions for activating the relay communication sidelink 215 are satisfied, to transmit/receive activation requests 230, and to transmit/receive separate control signaling to activate the relay communication sidelink 215. Accordingly, in cases where the RRC signaling 225 and/or the control message 235-a configure and activate the relay communication sidelink 215 at the same time, the UEs 115 and the base station 105-a may be configured to perform any of the processing described herein based on the configuration and activation of the relay communication sidelink 215.

In some aspects, first UE 115-a, the second UE 115-b, and the base station 105-a may communicate one or more messages 240 via the relay communication sidelink 215. For example, the first UE 115-a may transmit a message 240-a to the second UE 115-b via the relay communication sidelink 215 for relay to the base station 105-a via the relay communication sidelink 215. In this example, the second UE 115-b may forward (e.g., relay) the message 240-a to the base station 105-a via the relay communication sidelink 215. By way of another example, the base station 105-a may transmit a message 240-b to the second UE 115-b via the relay communication sidelink 215 for relay to the first UE 115-a via the relay communication sidelink 215. In this example, the second UE 115-b may forward (e.g., relay) the message 240-b to the first UE 115-a via the relay communication sidelink 215.

In some aspects, the first UE 115-a, the second UE 115-b, and the base station 105-a may communicate messages 240 via the relay communication sidelink 215 based on performing sidelink communications via the sidelink communication link 210, transmitting/receiving the RRC signaling 225, determining the parameters of the relay communication sidelink 215, determining the beam management configuration of the relay communication sidelink 215, determining the DRX configuration(s) of the UEs 115, determining the parameters of the communication links 205 and/or the UEs 115, determining whether trigger conditions for the relay communication sidelink 215 have been satisfied, transmitting/receiving the activation request 230, transmitting/receiving the control message 235-a activating the relay communication sidelink 215, or any combination thereof.

For example, the UEs 115 and the base station 105 may communicate messages 240 via the relay communication sidelink 215 based on (e.g., in accordance with) the first set of parameters associated with the activated state of the relay communication sidelink 215. By way of another example, the UEs 115 and the base station 105 may communicate messages 240 via the relay communication sidelink 215 within sets of resources indicated via grants included in the control message 235-a.

In some aspects, the messages 240 communicated via the relay communication sidelink 215 may be communicated using a beam which was selected using the beam management configuration associated with the relay communication sidelink 215. For example, the first UE 115-a, the second UE 115-b, the base station 105-a, or any combination thereof, may determine the beam management configuration associated with the relay communication sidelink 215. Parameters associated with the beam management configuration may include a type of beam selection measurements, a frequency of beam selection measurements, parameters for updating TCI states associated with the relay communication sidelink 215, BFD parameters, BFR parameters, or any combination thereof. In this regard, the UEs 115 and/or the base station 105-a may be configured to transmit reference signals and/or other signals and perform beam selection measurements on the signals in accordance with the beam management configuration. The UEs 115 and/or the base station 105-a may then select one or more beams associated with the relay communication sidelink 215 in accordance with the beam management configuration (e.g., based on the performed beam selection measurements), and may be configured to communicate messages 240 via the relay communication sidelink 215 using the selected beams.

In some implementations, the first UE 115-a, the second UE 115-a, or both, may transmit a deactivation request 245 to deactivate the relay communication sidelink 215. The UEs 115 may transmit the deactivation request 245 via the communication links 205 (e.g., Uu links) between the base station 105-a and the respective UE 115, via the relay communication sidelink 215, or both.

The UEs 115 may transmit the deactivation request 245 based on receiving the RRC signaling 225, determining the parameters of the relay communication sidelink 215, determining the beam management configuration of the relay communication sidelink 215, determining the DRX configuration(s) of the UEs 115, determining the parameters of the communication links 205 and/or the UEs 115, determining whether trigger conditions for the relay communication sidelink 215 have been satisfied, transmitting the activation request 230, receiving the control message 235-a activating the relay communication sidelink 215, communicating messages 240 via the relay communication sidelink 215, or any combination thereof.

For example, the first UE 115-a may transmit a deactivation request 245 based on determining that one or more trigger conditions for initiating/requesting deactivation of the relay communication sidelink 215 are satisfied. Trigger conditions (e.g., thresholds of trigger conditions) used for deactivation of the relay communication sidelink 215 may be different from trigger conditions used for activation of the relay communication sidelink 215.

In this regard, by transmitting the deactivation request 245 based on satisfaction of one or more trigger conditions, the UEs 115 may be configured to initiate/request deactivation of the relay communication sidelink 215 based on detection of issues associated with the relay communication sidelink 215 (e.g., low CQI, high latency, low throughput), reduced power saving needs at the UEs 115 (e.g., high battery levels), parameters of communication links 205 with the base station 105-a (e.g., high CQI, low latency, high throughput, low traffic), communications between the UEs 115, a quantity of traffic to be communicated between the UEs 115 and the base station 105-a, a presence of other higher quality relay communication sidelinks 215 with other UEs 115, limitations on a quantity of supported relay communication sidelinks 215, and the like. For example, the first UE 115-a may identify an additional relay communication sidelink 215 with a third UE 115 which has a higher quality than the relay communication sidelink 215 with the second UE 115-b, and may transmit the deactivation request 245 so that the relay communication sidelink 215 may be exchanged with the additional relay communication sidelink 215.

In some aspects, the base station 105-a may transmit a control message 235-b to the first UE 115-a, the second UE 115-b, or both, where the control message 235-b deactivates the relay communication sidelink 215. In this regard, the first UE 115-a, the second UE 115-b, the base station 105-a, or any combination thereof, may be configured to initiate deactivation of the relay communication sidelink 215.

In some aspects, the control message 235-b may be transmitted via L1 signaling (e.g., physical layer signaling), L2 signaling, or both. For example, the control message 235-a may be transmitted via L2 signaling and may include a MAC message (e.g., MAC-CE message). In some implementations, the base station 105-a may transmit the control message 235-b to the first UE 115-a and/or the second UE 115-b via the communication links 205 (e.g., Uu links) between the base station 105-a and the respective UEs 115. In additional or alternative implementations, the base station 105-a may transmit the control message 235-b to the first UE 115-a and/or the second UE 115-b via the relay communication sidelink 215, another sidelink communication link 210 between the respective UEs 115, or both. For example, the base station 105-a may transmit the control message 235-b to the second UE 115-b via the relay communication sidelink 215, and the second UE 115-b may forward (e.g., relay) the control message 235-b to the first UE 115-a via the relay communication sidelink 215.

The base station 105-a may transmit the control message 235-b deactivating the relay communication sidelink 215 based on transmitting the RRC signaling 225, determining the parameters of the relay communication sidelink 215, determining the beam management configuration of the relay communication sidelink 215, determining the DRX configuration(s) at the UEs 115, determining the parameters of the communication links 205 and/or the UEs 115, determining whether trigger conditions for the relay communication sidelink 215 have been satisfied, receiving the activation request 230, transmitting the control message 235-a activating the relay communication sidelink 215, communicating messages 240 via the relay communication sidelink 215, receiving the deactivation request 245, or any combination thereof.

In some aspects, the first UE 115-a and the second UE 115-b may communicate with one another via the sidelink communication link 210 (e.g., PC5 link) which is different from the relay communication sidelink 215. For example, the first UE 115-a and the second UE 115-b may exchange a sidelink message 220-b via the sidelink communication link following deactivation of the relay communication sidelink 215. In this regard, the relay communication sidelink 215 may be managed and operated separately and independently from the relay communication sidelink 215. As such, the sidelink communication link 210 used for the messages 220 may not be impacted by the activation of the relay communication sidelink 215, deactivation of the relay communication sidelink 215, or both. For example, in some cases, the UEs 115 may communicate with one another simultaneously using both the sidelink communication link 210 and the relay communication sidelink 215.

Techniques described herein may enable more efficient configuration and activation of relay communication sidelinks 215, which may enable more widespread use of relay communication sidelinks 215 between UEs 115. Moreover, by enabling more efficient and widespread use of relay communication sidelinks 215, techniques described herein may improve link diversity between the UEs 115 and the base station 105-a, thereby facilitating more reliable wireless communications within the wireless communications system. Further, improved use of relay communication sidelinks 215 may reduce power consumption at the first UE 115-a.

Figure 3B:
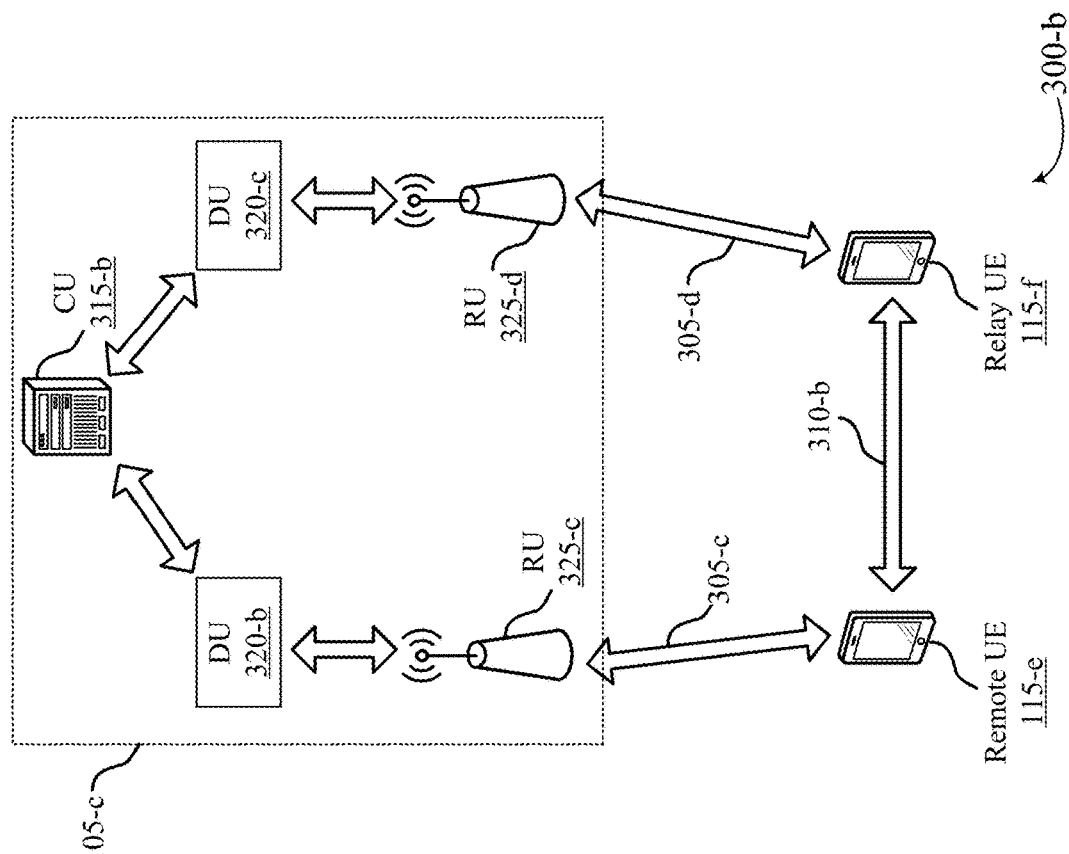
FIGS. 3A and 3B illustrate examples of wireless communications systems that support techniques for activating and deactivating UE relays in accordance with aspects of the present disclosure.
Figure 3A:
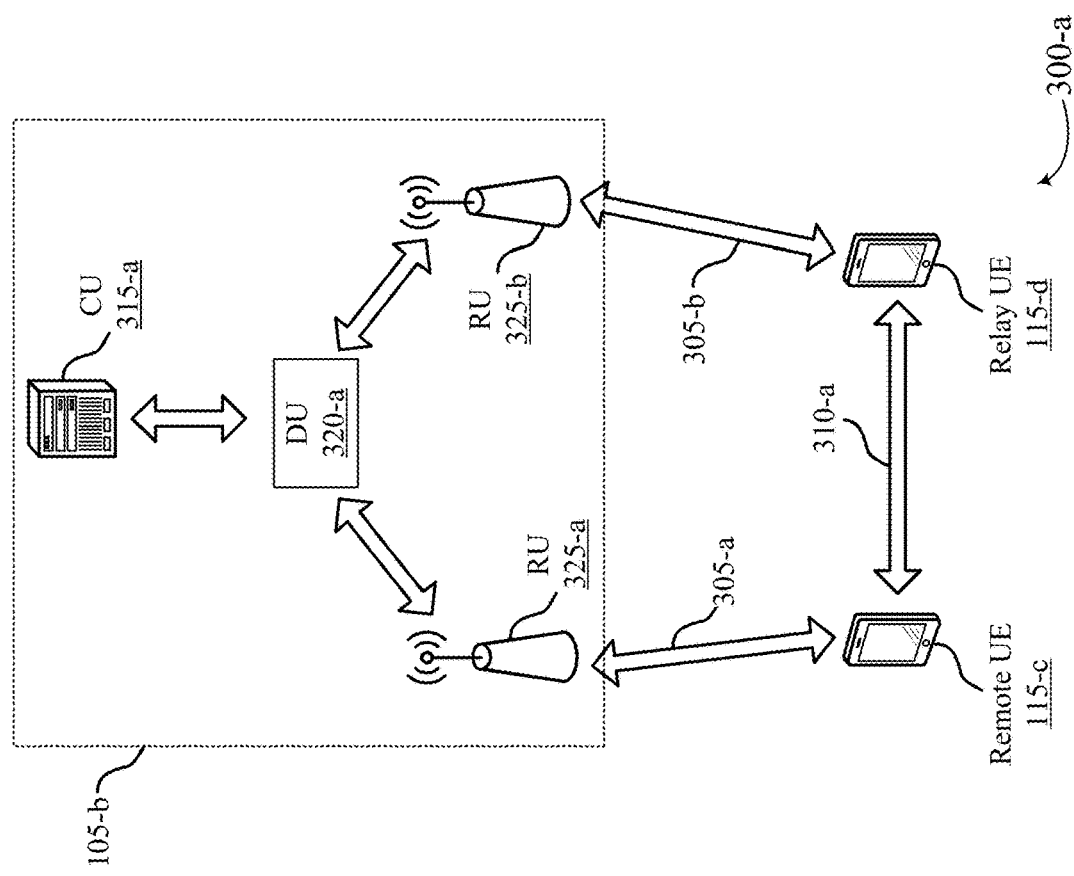

FIGS. 3A and 3B illustrate examples of wireless communications systems 300-a and 300-b that support techniques for activating and deactivating UE relays in accordance with aspects of the present disclosure. Aspects of the wireless communications systems 300-a and 300-b may implement, or be implemented by, aspects of the wireless communications system 100, wireless communications system 200, or both. Accordingly, any description associated with the wireless communications systems 100 and 200 may be regarded as applying to the wireless communications systems 300-a and 300-b, and vice versa.

The wireless communications system 300-a may include a base station 105-b, a first UE 115-c (e.g., remote UE 115-c), and a second UE 115-d (e.g., relay UE 115-d), which may be examples of UEs 115, base stations 105, and other wireless devices as described with reference to FIGS. 1 and 2. Similarly, the wireless communications system 300-b may include a base station 105-c, a first UE 115-e (e.g., remote UE 115-e), and a second UE 115-f (e.g., relay UE 115-f), which may be examples of UEs 115, base stations 105, and other wireless devices as described with reference to FIGS. 1 and 2.

The UEs 115 of the wireless communications systems 300-a and 300-b may communicate with the base stations 105 of the respective wireless communications systems 300 via communication links 305-a, 305-b, 305-c, and 305-d, which may be examples of NR or LTE links (e.g., Uu links). Moreover, the first UE 115-c and the second UE 115-d of the wireless communications system 300-a may be communicatively coupled via a communication link 310-a, which may include an example, of a sidelink communication link, a portion of a relay communication sidelink, or both. Similarly, the first UE 115-e and the second UE 115-f of the wireless communications system 300-b may be communicatively coupled via a communication link 310-b, which may include an example, of a sidelink communication link, a portion of a relay communication sidelink, or both.

In some aspects, the UEs 115 of the respective wireless communications systems 300 may be communicatively coupled to different remote units (RUs) 325 of the respective base stations 105. For example, as shown in wireless communications system 300-a, the base station 105-b may include a central unit (CU) 315-a, a distributed unit (DU) 320-a, a first RU 325-a, and a second RU 325-b. In this example, the first UE 115-c (e.g., remote UE 115-c) may be communicatively coupled to the first RU 325-a via the communication link 305-a, and the second UE 115-d (e.g., relay UE 115-d) may be communicatively coupled to the second RU 325-b via the communication link 305-b. In this regard, the UEs 115-c and 115-d may be served by different RUs 325, where the RUs 325 share the same DU 320-a and the same CU 315-a.

By way of another example, as shown in wireless communications system 300-b, the base station 105-c may include a CU 315-b, a first DU 320-b, a second DU 320-c, a first RU 325-c, and a second RU 325-d. In this example, the first UE 115-e (e.g., remote UE 115-e) may be communicatively coupled to the first RU 325-c via the communication link 305-c, and the second UE 115-f (e.g., relay UE 115-f) may be communicatively coupled to the second RU 325-d via the communication link 305-d. In this regard, the UEs 115-e and 115-f may be served by different RUs 325, where each RU 325 is served by a different DU 320 which shares a common CU 315-b.

In some aspects, the DU and/or MAC layer at the DUs 320 of the base stations 105 of the respective wireless communications systems 300-a and 300-b may be configured to carry out at least a portion of the processing used to configure, activate, and deactivate relay communication sidelinks (e.g., communication links 310-a, 310-b) between the respective UEs 115 and the base stations 105.

Figure 4:
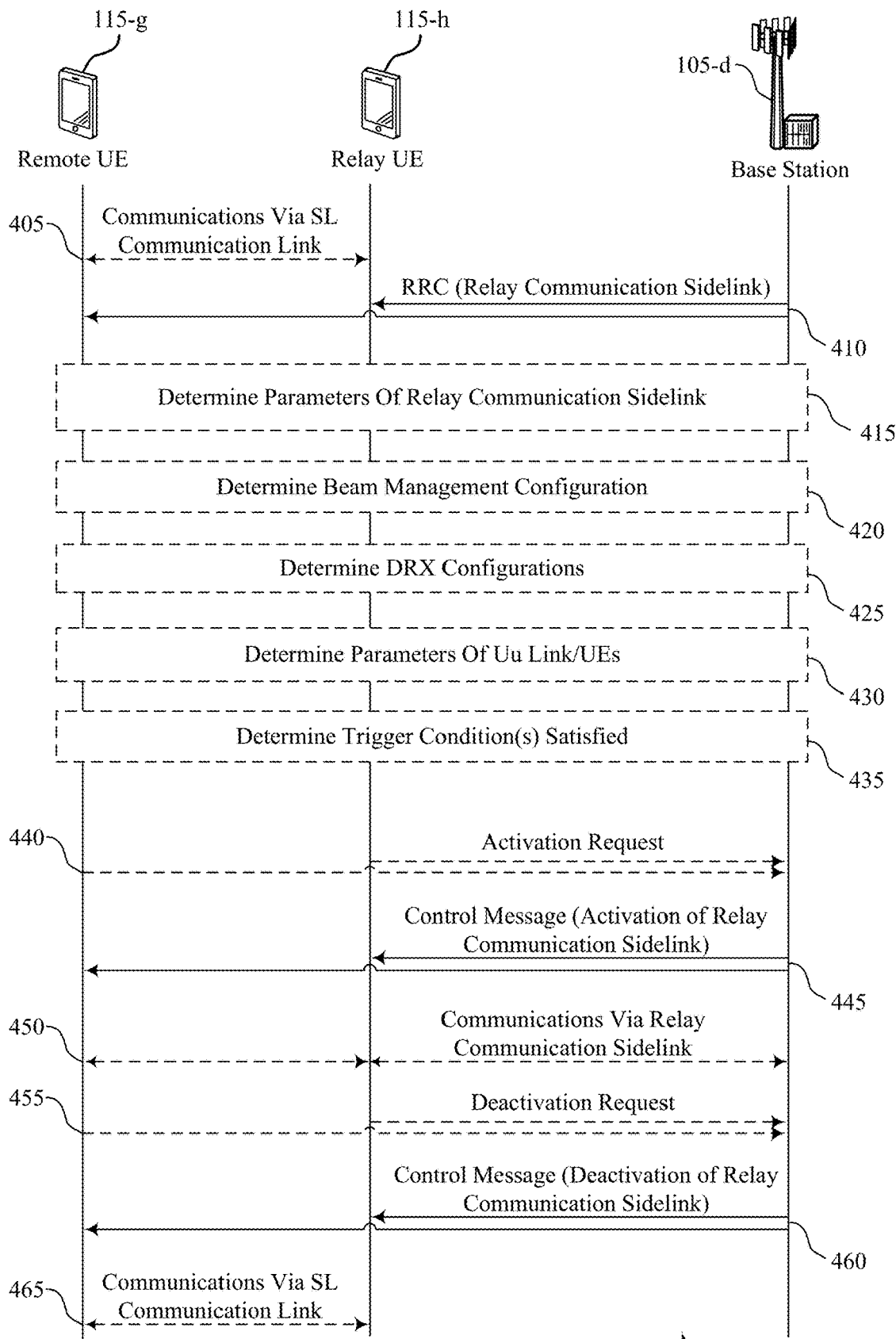
FIG. 4 illustrates an example of a process flow that supports techniques for activating and deactivating UE relays in accordance with aspects of the present disclosure.

FIG. 4 illustrates an example of a process flow 400 that supports techniques for activating and deactivating UE relays in accordance with aspects of the present disclosure. In some examples, process flow 400 may implement, or be implemented by, aspects of wireless communications system 100, wireless communications system 200, wireless communications systems 300-a and 300-b, or any combination thereof. For example, the process flow 400 may illustrate UEs 115 receiving RRC signaling configuring a relay communication sidelink, receiving L1 and/or L2 signaling which activates the relay communication sidelink, and communicating with a base station 105-d via the relay communication sidelink, as described with reference to FIGS. 1-3.

In some cases, process flow 400 may include a first UE 115-g (e.g., remote UE 115-g), a second UE 115-h (e.g., relay UE 115-h), and a base station 105-d, which may be examples of corresponding devices as described herein. For example, in some cases, the first UE 115-g and the second UE 115-h illustrated in FIG. 4 may be examples of the first UE 115-a and the second UE 115-b, respectively, as illustrated in FIG. 2. Similarly, the base station 105-d illustrated in FIG. 4 may be an example of the base station 105-a illustrated in FIG. 2.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the first UE 115-g and the second UE 115-h may communicate with one another via a sidelink communication link (e.g., PC5 link). For example, the first UE 115-g and the second UE 115-h may exchange sidelink transmissions via a sidelink communication link. In some aspects, the sidelink communication link used to facilitate communications between the UEs 115 at 405 may be different and independent from a relay communication sidelink which is used to facilitate relayed communications between the base station 105-d and the UEs 115.

At 410, the base station 105-d may transmit RRC signaling to the first UE 115-g, the second UE 115-h, or both. The UEs 115 may receive the RRC signaling at 410 via communication links (e.g., Uu links) between the base station 105-d and the respective UEs 115. In some aspects, the RRC signaling may configure a relay communication sidelink for communicating message traffic between the first UE 115-g and the second UE 115-h for relay to the base station 105-d. For example, the RRC signaling at 410 may configure a relay communication sidelink 215, as shown and described in FIG. 2.

In some aspects, the RRC signaling may configure the relay communication sidelink such that it is in initially in a deactivated state. In this regard, the RRC signaling may configure the relay communication sidelink such that it may be activated from the initial deactivated state to an activated state. In some aspects, there may be no transmission or reception of data (e.g., control data) over the relay communication sidelink while the relay communication sidelink is in the deactivated state. Additionally, or alternatively, the RRC signaling may configure the relay communication sidelink such that it is initially in the activated state. In other words, the relay communication sidelink may be activated at the same time that it is configured.

In some aspects, the RRC signaling may include information associated with the relay communication sidelink. Information associated with the relay communication sidelink may include, but is not limited to, trigger conditions for activating and/or deactivating the relay communication sidelink, parameters associated with activated/deactivated states of the relay communication sidelink, a beam management configuration associated with the relay communication sidelink, identifiers associated with wireless devices (e.g., first UE 115-g, second UE 115-h, base station 105-d) associated with the relay communication sidelink, and the like.

For example, in some aspects, the RRC signaling may indicate a set of trigger conditions for activating the relay communication sidelink. For instance, the RRC signaling may configure the UEs 115 to request activation of the relay communication sidelink if one or more trigger conditions are satisfied. Trigger conditions for activating (or requesting activation of) the relay communication sidelink may be based on characteristics associated with the Uu links between the base station 105-d and the respective UEs 115, characteristics associated with the sidelink communication link between the UEs 115, characteristics at the respective UEs 115, or any combination thereof. For instance, the UEs 115 may be configured, via the RRC signaling, to request activation of the relay communication sidelink based on low data throughput over the Uu link with base station 105-d, high latency over the Uu link, low CQI metrics of the Uu link, high traffic on the Uu link, high/low power levels at the UEs 115, or any combination thereof.

The RRC signaling may additionally or alternatively indicate a set of trigger conditions for deactivating (or requesting deactivation of) the relay communication sidelink. Trigger conditions for deactivating (or requesting deactivation of) the relay communication sidelink may also be based on characteristics associated with the Uu links between the base station 105-*d* and the respective UEs 115, sets of resources for communications over the relay communication sidelink, characteristics associated with the sidelink communication link between the UEs 115, characteristics at the respective UEs 115, or any combination thereof.

At 415, the first UE 115-*g*, the second UE 115-*h*, the base station 105-*d*, or any combination thereof, may determine parameters associated with the relay communication sidelink. In some aspects, the UEs 115 and the base station 105-*d* may determine the parameters associated with the relay communication sidelink based on transmitting/receiving the RRC signaling at 410. For example, the RRC signaling at 410 may indicate parameters associated with the relay communication sidelink, and the UEs 115 may determine the parameters based on receiving the RRC signaling.

In some aspects, parameters associated with the activated and deactivated states of the relay communication sidelink may include, but are not limited to, trigger conditions for activating/deactivating the relay communication sidelink, parameters for grants scheduling data/transmissions to be relayed via the relay communication sidelink, BFD parameters, BFR parameters, CSI feedback parameters, and the like.

For example, the RRC signaling may indicate a first set of parameters associated with the activated state of the relay communication sidelink, and a second set of parameters associated with the deactivated state of the relay communication sidelink. The first set of parameters associated with the activated state may be different from the second set of parameters associated with the deactivated state. In this example, the UEs 115 may be configured to determine the first set of parameters, the second set of parameters, or both, based on the RRC signaling. In additional or alternative implementations, the UEs 115 may be pre-configured with parameters associated with the relay communication sidelink.

At 420, the first UE 115-*g*, the second UE 115-*h*, the base station 105-*d*, or any combination thereof, may determine a beam management configuration associated with the relay communication sidelink. In some aspects, the UEs 115 and the base station 105-*d* may determine the beam management configuration associated with the relay communication sidelink based on transmitting/receiving the RRC signaling at 410, determining the parameters associated with the relay communication sidelink at 415, or both.

In some aspects, the beam management configuration may include one or more parameters for selecting a beam associated with the relay communication sidelink. In other words, the beam management configuration may include parameters for selecting beams which will be used to transmit/receive information that is conveyed via the relay communication sidelink. For example, the parameters associated with the beam management configuration may include a type of beam selection measurements, a frequency of beam selection measurements, parameters for updating TCI states associated with the relay communication sidelink, BFD parameters, BFR parameters, or any combination thereof.

In some aspects, the beam management configuration may configure varying levels or degrees of beam management for the activated and deactivated states of the relay communication sidelink. In particular, the beam management configuration may configure the respective wireless devices to take a more active role in managing/selecting beams for the relay communication sidelink while the relay communication sidelink is in the activated state as compared to when it is in the deactivated state.

For example, the beam management configuration may indicate a frequency at which the UEs 115 and/or the base station 105-*d* are to transmit reference signals (e.g., transmit L1 signals) and/or perform beam selection measurements (e.g., L1 measurements) for selecting a beam for the relay communication sidelink. In some cases, the beam management configuration may configure the UEs 115 to perform more frequent beam selection measurements when the relay communication sidelink is in the activated state as compared to when the relay communication sidelink is in the deactivated state. Configuring the UEs 115 and/or base station 105-*d* to perform beam selection measurements while the relay communication sidelink is in the deactivated state may enable faster beam selection and activation for the relay communication sidelink.

By way of another example, the relay management configuration may configure the UEs 115 and/or the base station 105-*c* to perform beam selection measurements (e.g., L3 measurements) only at a time of activation of the relay communication sidelink. In this example, the beam management configuration may not configure the UEs 115 and/or the base station 105-*c* to perform beam selection measurements when the relay communication sidelink is in the deactivated state. Beam management configurations which configure the respective wireless devices from performing beam selection measurements in the deactivated state may enable more power-efficient operation of the relay communication sidelink.

At 425, the first UE 115-*g*, the second UE 115-*h*, the base station 105-*d*, or any combination thereof, may determine DRX configurations associated with the first UE 115-*g*, the second UE 115-*h*, or both. In some aspects, the UEs 115 and/or the base station 105-*d* may determine the DRX configuration(s) at 425 based on performing sidelink communications via the sidelink communication link at 405, transmitting/receiving the RRC signaling at 410, determining the parameters of the relay communication link at 415, determining the beam management configuration of the relay communication sidelink at 420, or any combination thereof.

In some implementations, the UEs 115 may determine the DRX configurations of each of the UEs 115 so that they may at least partially align the active durations of the respective DRX configurations. For example, the first UE 115-*g* may determine a first DRX configuration at the first UE 115-*g*, and may determine a second DRX configuration at the second UE 115-*h* based on signaling received from the second UE 115-*h*. In this example, the first UE 115-*g* and the second UE 115-*h* may selectively adjust the first DRX configuration and/or the second DRX configuration so that a first set of active durations of the first DRX configuration at least partially overlap with a second set of active durations of the second DRX configuration. As such, the UEs 115 may be configured to perform communications over the relay communication sidelink within the portions of the first set of active durations and the second set of active durations which overlap with one another. Moreover, by determining and/or adjusting the DRX configurations at the respective UEs 115, techniques described herein may support more efficient operation of the relay communication sidelink while enabling longer inactive durations of the DRX configurations, thereby improving power savings at the UEs 115.

At 430, the first UE 115-*g*, the second UE 115-*h*, the base station 105-*d*, or any combination thereof, may determine parameters associated with the communication links (e.g., Uu links) between the UEs 115 and the base station 105-*d*, parameters associated with the UEs 115 themselves, or both. The UEs 115 and/or the base station 105-*d* may determine the parameters associated with the Uu links and/or the UEs 115 at 430 based on performing sidelink communications via the sidelink communication link at 405, transmitting/receiving the RRC signaling at 410, determining the parameters of the relay communication link at 415, determining the beam management configuration of the relay communication sidelink at 420, determining the DRX configuration(s) at 425, or any combination thereof. Additionally, or alternatively, the respective wireless devices may determine the parameters associated with the Uu links and/or the UEs 115 at 430 based on communications performed between the base station 105-*d* and the UEs 115 over the respective Uu links.

For example, the first UE 115-*g* and/or the base station 105-*d* may determine a first set of parameters associated with a communication link (e.g., Uu link) between the first UE 115-*g* and the base station 105-*d*. The first set of one or more parameters associated with the communication link may include a latency of the communication link, a throughput of the communication link, traffic performed over the communication link, a CQI metric of the communication link (e.g., RSRP, RSRQ, RSSI, SNR, SINR), or any combination thereof. The first UE 115-*g* and the base station 105-*d* may determine the first set of parameters associated with the communication link based on transmitting/receiving reference signals and other communications via the communication link, and performing measurements on the received signals.

By way of another example, the first UE 115-*g* and/or the base station 105-*d* may determine a second set of one or more parameters associated with the first UE 115-*g*. The second set of parameters associated with the first UE 115-*g* may include a power consumption level at the first UE 115-*g*, a battery level (e.g., power level), a presence (or absence) of an external power source coupled to the first UE 115-*g* (e.g., outlet, battery pack), or any combination thereof.

In some aspects, parameters associated with the UEs 115, parameters associated with the communication links (e.g., Uu links) between the base station 105-*d* and the respective UEs 115, or both, may be used to determine whether the relay communication sidelink is to be activated or deactivated, as will be described in further detail herein.

At 435, the first UE 115-*g*, the second UE 115-*h*, the base station 105-*d*, or any combination thereof, may determine whether one or more trigger conditions for activating the relay communication sidelink have been satisfied. In some aspects, the first UE 115-*g*, the second UE 115-*h*, and/or the base station 105-*d* may be configured to initiate and/or request activation of the relay communication sidelink, and may therefore be configured to monitor whether the trigger conditions have been satisfied. The UEs 115 and/or the base station 105-*d* may determine whether trigger conditions for activating the relay communication sidelink have been satisfied based on performing sidelink communications via the sidelink communication link at 405, transmitting/receiving the RRC signaling at 410, determining the parameters of the relay communication link at 415, determining the beam management configuration of the relay communication sidelink at 420, determining the DRX configuration(s) at 425, determining the parameters of the Uu links and/or the UEs 115 at 430, or any combination thereof.

For example, the RRC signaling received at 410 may indicate a trigger condition for activating the relay communication sidelink when a CQI of the communication link between the first UE 115-*g* and the base station 105-*d* satisfies a CQI threshold ($CQI_{Thresh}$). In this example, the trigger condition may be satisfied if the CQI is less than or equal to the CQI threshold (e.g., trigger condition satisfied if $CQI \leq CQI_{Thresh}$) In this example, the first UE 115-*g*, the base station 105-*d*, or both, may determine that a trigger condition for activating the relay communication sidelink is satisfied based on determining that a CQI of the communication link between the first UE 115-*g* and the base station 105-*d* is less than or equal to the CQI threshold.

By way of another example, the RRC signaling received at 410 may indicate a trigger condition for activating the relay communication sidelink when a battery level ($Batt_{UE}$) of the first UE 115-*g* satisfies a battery level threshold ($Batt_{Thresh}$). In this example, the trigger condition may be satisfied if the battery level of the first UE 115-*g* is less than or equal to the battery level threshold (e.g., trigger condition satisfied if $Batt_{UE} \leq Batt_{Thresh}$) In this example, the first UE 115-*g*, the base station 105-*d*, or both, may determine that a trigger condition for activating the relay communication sidelink is satisfied based on determining that the battery level at the first UE 115-*g* is less than or equal to the battery level threshold.

Trigger conditions for activating the relay communication sidelink may be based on parameters of the Uu links between the base station 105-*d* and the respective UEs 115 determined at 430, parameters of the respective UEs 115 determined at 430, parameters of the sidelink communication link between the UEs 115, or any combination thereof. Moreover, activation of the relay communication sidelink may be based on any quantity of trigger conditions being satisfied. For example, in some cases, satisfaction of a single trigger condition may be enough to initiate and/or request activation of the relay communication sidelink. In other cases, activation of the relay communication sidelink may be based on satisfaction of multiple trigger conditions. For example, activation of the relay communication sidelink may be based on a first quality ($Q_1$) of the Uu link between the first UE 115-*g* and the base station 105-*d* being less than or equal to a first threshold quality (e.g., $Q_1 \leq Q_{1,Thresh}$), as well as a second quality ($Q_2$) of the sidelink communication link being greater than or equal to a second threshold quality (e.g., $Q_2 \geq Q_{2,Thresh}$).

Additionally, or alternatively, the trigger conditions for activating the relay communication sidelink between the first UE 115-*g* and the second UE 115-*h* may be based on parameters of other relay communication sidelinks between one of the UEs 115 and another UE 115. For example, the first UE 115-*g* may be configured to communicate with the base station 105-*d* via an additional relay communication sidelink with a third UE 115. In this example, a trigger condition for activating the relay communication sidelink with the second UE 115-*h* may include a quality of the relay communication sidelink with the second UE 115-*g* exceeding a quality of the additional relay communication sidelink.

At 440, the first UE 115-*g*, the second UE 115-*g*, or both, may transmit an activation request to activate the relay communication sidelink to the base station 105-*d*. In some aspects, the first UE 115-*g*, the second UE 115-*g*, or both, may transmit an activation request at 440 via the communication link (e.g., Uu link) between the base station 105-*d* and the respective UE 115. For example, the first UE 115-*g* may transmit an activation request to the base station 105-*d* via a Uu link between the first UE 115-*g* and the base station 105-*d*.

The UEs 115 may transmit the activation request based on performing sidelink communications via the sidelink communication link at 405, receiving the RRC signaling at 410, determining the parameters of the relay communication link at 415, determining the beam management configuration of the relay communication sidelink at 420, determining the DRX configuration(s) at 425, determining the parameters of the Uu links and/or the UEs 115 at 430, determining whether trigger conditions for the relay communication sidelink have been satisfied at 435, or any combination thereof.

For example, the first UE 115-g may transmit an activation request at 440 based on determining that one or more trigger conditions for initiating/requesting activation of the relay communication link are satisfied at 435. In this regard, by transmitting the activation request based on satisfaction of one or more trigger conditions, the UEs 115 may be configured to initiate/request activation of the relay communication sidelink based on detection of issues associated with direct Uu links with the base station 105-d (e.g., low CQI, high latency, low throughput, high traffic), power saving needs at the UEs 115 (e.g., low battery levels), high performance of sidelink communications between the UEs 115, and the like.

At 445, the base station 105-d may transmit a control message to the first UE 115-g, the second UE 115-h, or both, where the control message activates the relay communication sidelink. In some aspects, the control message may be transmitted via L1 signaling, L2 signaling, or both. In some implementations, the base station 105-d may transmit the control message to the first UE 115-g and/or the second UE 115-h via the communication links (e.g., Uu links) between the base station 105-d and the respective UEs 115. In additional or alternative implementations, the base station 105-d may transmit the control message to the first UE 115-g and/or the second UE 115-h via the relay communication sidelink, another sidelink communication link between the respective UEs 115, or both. For example, the base station 105-d may transmit the control message to the second UE 115-h via the relay communication sidelink, and the second UE 115-h may forward (e.g., relay) the control message to the first UE 115-g via the relay communication sidelink.

The UEs 115 may receive, and the base station 105-d may transmit, the control message activating the relay communication sidelink at 445 based on performing sidelink communications via the sidelink communication link at 405, transmitting/receiving the RRC signaling at 410, determining the parameters of the relay communication link at 415, determining the beam management configuration of the relay communication sidelink at 420, determining the DRX configuration(s) at 425, determining the parameters of the Uu links and/or the UEs 115 at 430, determining whether trigger conditions for the relay communication sidelink have been satisfied at 435, transmitting/receiving the activation request at 440, or any combination thereof. For example, the base station 105-d may transmit the control message activating the relay communication sidelink in response to receiving an activation request from the first UE 115-g and/or the second UE 115-h at 440.

In cases where the relay communication sidelink is initially configured in the deactivated state, the control message may include an indication to transition the relay communication sidelink from the deactivated state to the activated state. In some aspects, the control message may indicate a set of resources for communications to be performed over the relay communication sidelink. For example, the control message may include a grant allocating a resource on the relay communication sidelink for communicating a message between the first UE 115-g and the second UE 115-h, for communicating the message between the second UE 115-h and the base station 105-d, or both.

The control message may activate the relay communication sidelink. As noted previously herein, the RRC signaling may initially configure the relay communication sidelink in the deactivated state such that it may be subsequently activated via L1/L2 signaling (e.g., the control message at 445). However, in additional or alternative implementations, the relay communication sidelink may be configured and activated at the same time, via the same control signaling, or both. For example, in some cases, the RRC signaling at 410 or the control message at 445 may both configure and activate the relay communication sidelink. In such cases, because the relay communication sidelink is already activated, it may be unnecessary to determine whether trigger conditions for activating the relay communication sidelink are satisfied, to transmit/receive activation requests, and to transmit/receive separate control signaling to activate the relay communication sidelink. Accordingly, in cases where the RRC signaling at 410 and/or the control message at 445 both configures and activates the relay communication sidelink, the UEs 115 and the base station 105-d may be configured to perform any of the steps 415 through 430 based on the configuration and/or activation of the relay communication sidelink.

At 450, the first UE 115-g, the second UE 115-h, and the base station 105-d may communicate one or more messages via the relay communication sidelink. For example, the first UE 115-g may transmit a message to the second UE 115-h via the relay communication sidelink for relay to the base station 105-d via the relay communication sidelink. By way of another example, the base station 105-d may transmit a message to the second UE 115-h via the relay communication sidelink for relay to the first UE 115-g via the relay communication sidelink.

In some aspects, the first UE 115-g, the second UE 115-h, and the base station 105-d may communicate via the relay communication sidelink at 450 based on performing sidelink communications via the sidelink communication link at 405, transmitting/receiving the RRC signaling at 410, determining the parameters of the relay communication link at 415, determining the beam management configuration of the relay communication sidelink at 420, determining the DRX configuration(s) at 425, determining the parameters of the Uu links and/or the UEs 115 at 430, determining whether trigger conditions for the relay communication sidelink have been satisfied at 435, transmitting/receiving the activation request at 440, transmitting/receiving the control message activating the relay communication sidelink at 445, or any combination thereof.

For example, the UEs 115 and the base station 105 may communicate messages via the relay communication sidelink based on (e.g., in accordance with) the first set of parameters associated with the activated state of the relay communication sidelink which were determined at 415. By way of another example, the UEs 115 and the base station 105 may communicate messages via the relay communication sidelink within sets of resources indicated via grants included in the control message at 445.

In some aspects, the messages communicated via the relay communication sidelink at 450 may be communicated using a beam which was selected using the beam management configuration associated with the relay communication sidelink. For example, the first UE 115-g, the second UE 115-h, the base station 105-d, or any combination thereof, may determine the beam management configuration associated with the relay communication sidelink at 420. Parameters associated with the beam management configuration may include a type of beam selection measurements, a frequency of beam selection measurements, parameters for updating TCI states associated with the relay communication sidelink, BFD parameters, BFR parameters, or any combination thereof. In this regard, the UEs 115 and/or the base station 105-d may be configured to select one or more beams associated with the relay communication sidelink in accordance with the beam management configuration, and may be configured to communicate messages via the relay communication sidelink using the selected beams.

At 455, the first UE 115-g, the second UE 115-g, or both, may transmit a deactivation request to deactivate the relay communication sidelink to the base station 105-d. The UEs 115 may transmit the deactivation request at 455 via the communication link (e.g., Uu link) between the base station 105-d and the respective UE 115, via the relay communication sidelink, or both.

The UEs 115 may transmit the deactivation request based on receiving the RRC signaling at 410, determining the parameters of the relay communication link at 415, determining the beam management configuration of the relay communication sidelink at 420, determining the DRX configuration(s) at 425, determining the parameters of the Uu links and/or the UEs 115 at 430, determining whether trigger conditions for the relay communication sidelink have been satisfied at 435, transmitting the activation request at 440, receiving the control message activating the relay communication sidelink at 445, communicating messages via the relay communication sidelink at 450, or any combination thereof.

For example, the first UE 115-g may transmit a deactivation request at 455 based on determining that one or more trigger conditions for initiating/requesting deactivation of the relay communication sidelink are satisfied. Trigger conditions (e.g., thresholds of trigger conditions) used for deactivation of the relay communication sidelink may be different from trigger conditions used for activation of the relay communication sidelink.

In this regard, by transmitting the deactivation request based on satisfaction of one or more trigger conditions, the UEs 115 may be configured to initiate/request deactivation of the relay communication sidelink based on detection of issues associated with the relay communication sidelink (e.g., low CQI, high latency, low throughput), reduced power saving needs at the UEs 115 (e.g., high battery levels), parameters of Uu links with the base station 105-d (e.g., high CQI, low latency, high throughput, low traffic), communications between the UEs 115, a quantity of traffic to be communicated between the UEs 115 and the base station 105-d, a presence of other higher quality relay communication sidelinks with other UEs 115, limitations on a quantity of supported relay communication sidelinks, and the like. For example, the first UE 115-g may identify an additional relay communication sidelink with a third UE 115 which has a higher quality than the relay communication sidelink with the second UE 115-h, and may transmit the deactivation request so that the relay communication sidelink may be exchanged with the additional relay communication sidelink.

At 460, the base station 105-d may transmit a control message to the first UE 115-g, the second UE 115-h, or both, where the control message deactivates the relay communication sidelink. In this regard, the first UE 115-g, the second UE 115-h, the base station 105-d, or any combination thereof, may be configured to initiate deactivation of the relay communication sidelink. In some aspects, the control message may be transmitted via L1 signaling, L2 signaling, or both. In some implementations, the base station 105-d may transmit the control message to the first UE 115-g and/or the second UE 115-h via the communication links (e.g., Uu links) between the base station 105-d and the respective UEs 115. In additional or alternative implementations, the base station 105-d may transmit the control message to the first UE 115-g and/or the second UE 115-h via the relay communication sidelink, another sidelink communication link between the respective UEs 115, or both. For example, the base station 105-d may transmit the control message to the second UE 115-h via the relay communication sidelink, and the second UE 115-h may forward (e.g., relay) the control message to the first UE 115-g via the relay communication sidelink.

The base station 105-d may transmit the control message deactivating the relay communication sidelink based on transmitting the RRC signaling at 410, determining the parameters of the relay communication link at 415, determining the beam management configuration of the relay communication sidelink at 420, determining the DRX configuration(s) at 425, determining the parameters of the Uu links and/or the UEs 115 at 430, determining whether trigger conditions for the relay communication sidelink have been satisfied at 435, receiving the activation request at 440, transmitting the control message activating the relay communication sidelink at 445, communicating messages via the relay communication sidelink at 450, receiving the deactivation request at 455, or any combination thereof.

At 465, the first UE 115-g and the second UE 115-h may communicate with one another via the sidelink communication link (e.g., PC5 link) which is different from the relay communication sidelink. For example, the first UE 115-g and the second UE 115-h may exchange sidelink transmissions via the sidelink communication link. In this regard, the relay communication sidelink may be managed and operated separately and independently from the relay communication sidelink. As such, the sidelink communication link used for the communications at 465 may not be impacted by the activation of the relay communication sidelink at 445, deactivation of the relay communication sidelink at 460, or both.

Techniques described herein may enable more efficient configuration and activation of relay communication sidelinks, which may enable more widespread use of relay communication sidelinks between UEs 115. Moreover, by enabling more efficient and widespread use of relay communication sidelinks, techniques described herein may improve link diversity between the UEs 115 and the base station 105-d, thereby facilitating more reliable wireless communications within the wireless communications system. Further, improved use of relay communication sidelinks may reduce power consumption at the first UE 115-g.

Figure 5:
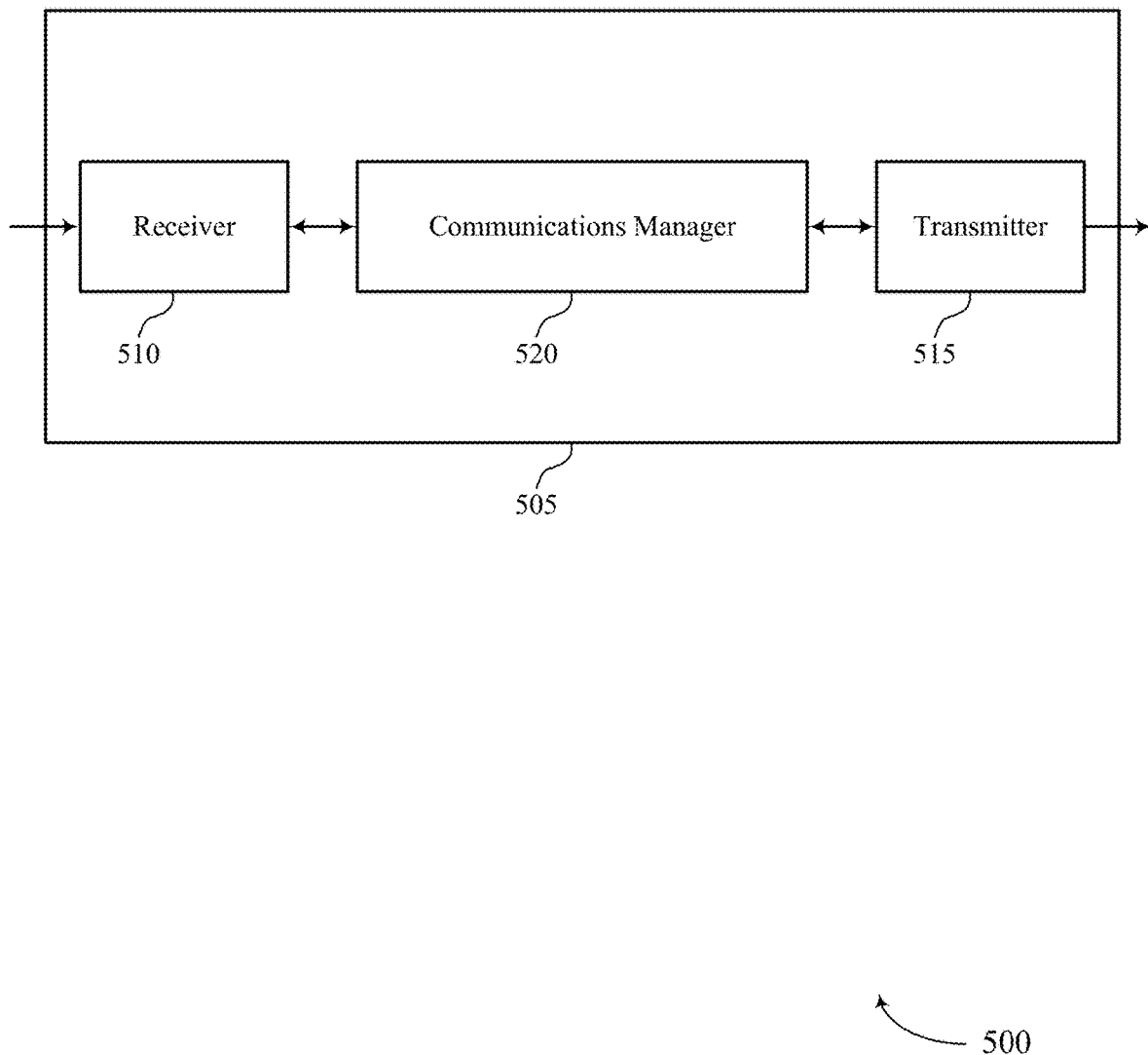
FIGS. 5 and 6 show block diagrams of devices that support techniques for activating and deactivating UE relays in accordance with aspects of the present disclosure.

FIG. 5 shows a block diagram 500 of a device 505 that supports techniques for activating and deactivating UE relays in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for activating and deactivating UE relays). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for activating and deactivating UE relays). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for activating and deactivating UE relays as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for receiving, via a communication link between the first UE and a base station, RRC signaling which configures a relay communication sidelink for communicating message traffic between the first UE and a second UE for relay to the base station. The communications manager 520 may be configured as or otherwise support a means for receiving a control message via L1 signaling or L2 signaling which activates the relay communication sidelink configured by the RRC signaling. The communications manager 520 may be configured as or otherwise support a means for communicating, via the relay communication sidelink, a message for relay to or from the base station based on the control message.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient configuration and activation of relay communication sidelinks, which may enable more widespread use of relay communication sidelinks between UEs 115. Moreover, by enabling more efficient and widespread use of relay communication sidelinks, techniques described herein may improve link diversity between the UEs 115 and the base station 105, thereby facilitating more reliable wireless communications within the wireless communications system. Further, improved use of relay communication sidelinks may reduce power consumption at the remote UEs 115.

Figure 6:
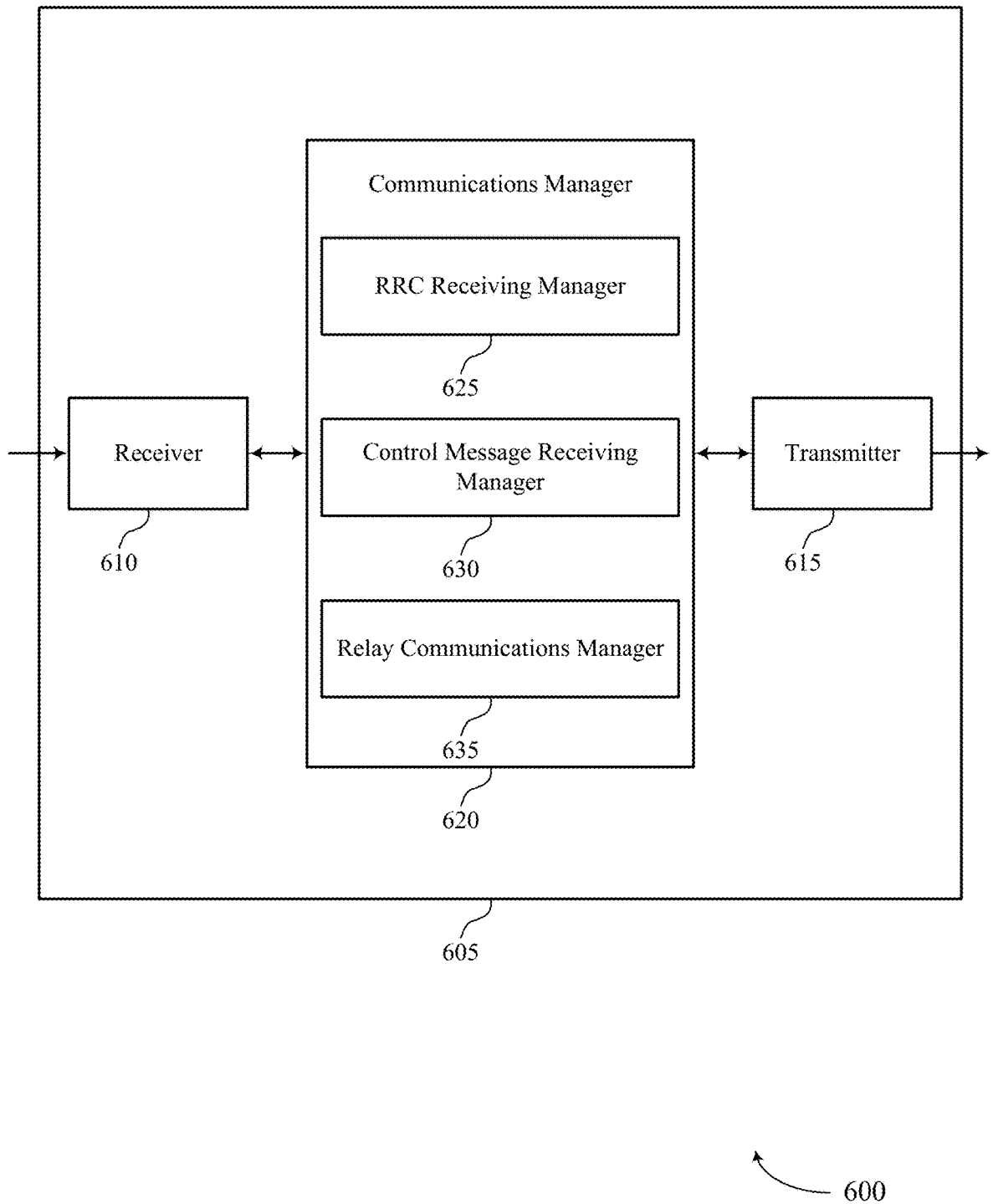

FIG. 6 shows a block diagram 600 of a device 605 that supports techniques for activating and deactivating UE relays in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for activating and deactivating UE relays). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for activating and deactivating UE relays). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for activating and deactivating UE relays as described herein. For example, the communications manager 620 may include an RRC receiving manager 625, a control message receiving manager 630, a relay communications manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The RRC receiving manager 625 may be configured as or otherwise support a means for receiving, via a communication link between the first UE and a base station, RRC signaling which configures a relay communication sidelink for communicating message traffic between the first UE and a second UE for relay to the base station. The control message receiving manager 630 may be configured as or otherwise support a means for receiving a control message via L1 signaling or L2 signaling which activates the relay communication sidelink configured by the RRC signaling. The relay communications manager 635 may be configured as or otherwise support a means for communicating, via the relay communication sidelink, a message for relay to or from the base station based on the control message.

Figure 7:
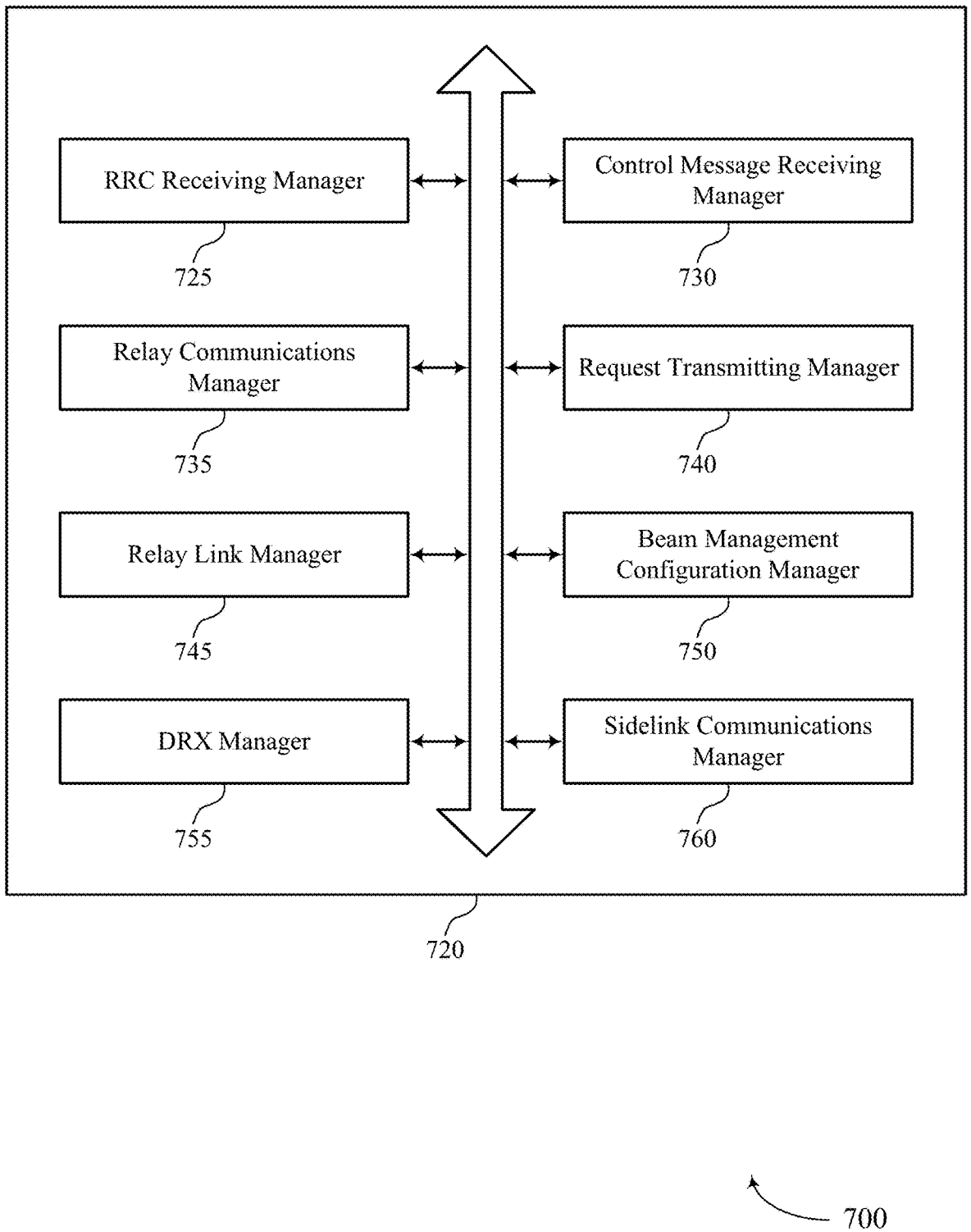
FIG. 7 shows a block diagram of a communications manager that supports techniques for activating and deactivating UE relays in accordance with aspects of the present disclosure.

FIG. 7 shows a block diagram 700 of a communications manager 720 that supports techniques for activating and deactivating UE relays in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for activating and deactivating UE relays as described herein. For example, the communications manager 720 may include an RRC receiving manager 725, a control message receiving manager 730, a relay communications manager 735, a request transmitting manager 740, a relay link manager 745, a beam management configuration manager 750, a DRX manager 755, a sidelink communications manager 760, or any combination thereof. Each of these components may communicate, directly or indirectly, with one another (e.g., via one or more buses).

The communications manager 720 may support wireless communication at a first UE in accordance with examples as disclosed herein. The RRC receiving manager 725 may be configured as or otherwise support a means for receiving, via a communication link between the first UE and a base station, RRC signaling which configures a relay communication sidelink for communicating message traffic between the first UE and a second UE for relay to the base station. The control message receiving manager 730 may be configured as or otherwise support a means for receiving a control message via L1 signaling or L2 signaling which activates the relay communication sidelink configured by the RRC signaling. The relay communications manager 735 may be configured as or otherwise support a means for communicating, via the relay communication sidelink, a message for relay to or from the base station based on the control message.

In some examples, to support receiving the control message, the control message receiving manager 730 may be configured as or otherwise support a means for receiving the control message that includes a grant allocating a resource on the relay communication sidelink for communicating the message between the first UE and the second UE.

In some examples, the request transmitting manager 740 may be configured as or otherwise support a means for transmitting, to the base station, an activation request to activate the relay communication sidelink, where the RRC signaling, the control message, or both, is received based on transmitting the activation request. In some examples, the request transmitting manager 740 may be configured as or otherwise support a means for transmitting the activation request based on one or more trigger conditions for activating the relay communication sidelink being satisfied.

In some examples, the RRC receiving manager 725 may be configured as or otherwise support a means for receiving, via the RRC signaling, an indication of the one or more trigger conditions.

In some examples, the request transmitting manager 740 may be configured as or otherwise support a means for transmitting, to the base station, a deactivation request to deactivate the relay communication sidelink. In some examples, the control message receiving manager 730 may be configured as or otherwise support a means for receiving, in response to the deactivation request, a second control message which deactivates the relay communication sidelink.

In some examples, the relay communication sidelink is in an activated state or a deactivated state, and the control message receiving manager 730 may be configured as or otherwise support a means for receiving, via the control message, an indication to transition the relay communication sidelink from the deactivated state to the activated state.

In some examples, the relay link manager 745 may be configured as or otherwise support a means for determining a first set of parameters associated with the activated state of the relay communication sidelink and a second set of parameters associated with the deactivated state of the relay communication sidelink, where communicating the message via the relay communication sidelink is based on the first set of parameters.

In some examples, the RRC receiving manager 725 may be configured as or otherwise support a means for receiving, via the RRC signaling, an indication of the first set of parameters, the second set of parameters, or both.

In some examples, the relay link manager 745 may be configured as or otherwise support a means for determining a first set of one or more parameters associated with the communication link between the first UE and the base station, a second set of one or more parameters associated with the first UE, or both. In some examples, the relay link manager 745 may be configured as or otherwise support a means for determining that one or more trigger conditions for activating or deactivating the relay communication sidelink are satisfied based on the first set of one or more parameters, the second set of one or more parameters, or both. In some examples, the first set of one or more parameters associated with the communication link includes a latency, a throughput, a CQI, or any combination thereof. In some examples, the second set of one or more parameters associated with the first UE includes a power consumption level, a battery level, or both.

In some examples, the beam management configuration manager 750 may be configured as or otherwise support a means for determining a beam management configuration associated with the relay communication sidelink, where the message is communicated via the relay communication sidelink based on a beam selected in accordance with the beam management configuration.

In some examples, the RRC receiving manager 725 may be configured as or otherwise support a means for receiving, via the RRC signaling, information associated with the beam management configuration, where determining the beam management configuration is based on the RRC signaling. In some examples, the beam management configuration includes a set of one or more parameters for selecting a beam associated with the relay communication sidelink, the set of one or more parameters including a type of beam selection measurements, a frequency of beam selection measurement, one or more parameters for updating TCI states associated with the relay communication sidelink, one or more BFD parameters, one or more BFR parameters, or any combination thereof.

In some examples, the DRX manager 755 may be configured as or otherwise support a means for determining a DRX configuration associated with the first UE, the second UE, or both, where communicating the message via the relay communication sidelink is based on the identified DRX configuration.

In some examples, the RRC signaling includes the control message.

In some examples, the sidelink communications manager 760 may be configured as or otherwise support a means for communicating a second message via a sidelink communication link between the first UE and the second UE, where the sidelink communication link is different from the relay communication sidelink.

In some examples, the control message is received via the communication link between the first UE and the base station, via a sidelink communication link between the first UE and the second UE, or both.

In some examples, to support communicating the message via the relay communication sidelink, the relay communications manager 735 may be configured as or otherwise support a means for receiving the message relayed to the first UE by the second UE via the relay communication sidelink, or transmitting the message to the second UE via the relay communication sidelink for relay to the base station. In some examples, to support communicating the message via the relay communication sidelink, the relay communications manager 735 may be configured as or otherwise support a means for receiving the message from the base station and relaying the message to the second UE via the relay communication sidelink, or receiving the message from the second UE via the relay communication sidelink and relaying the message to the base station.

Figure 8:
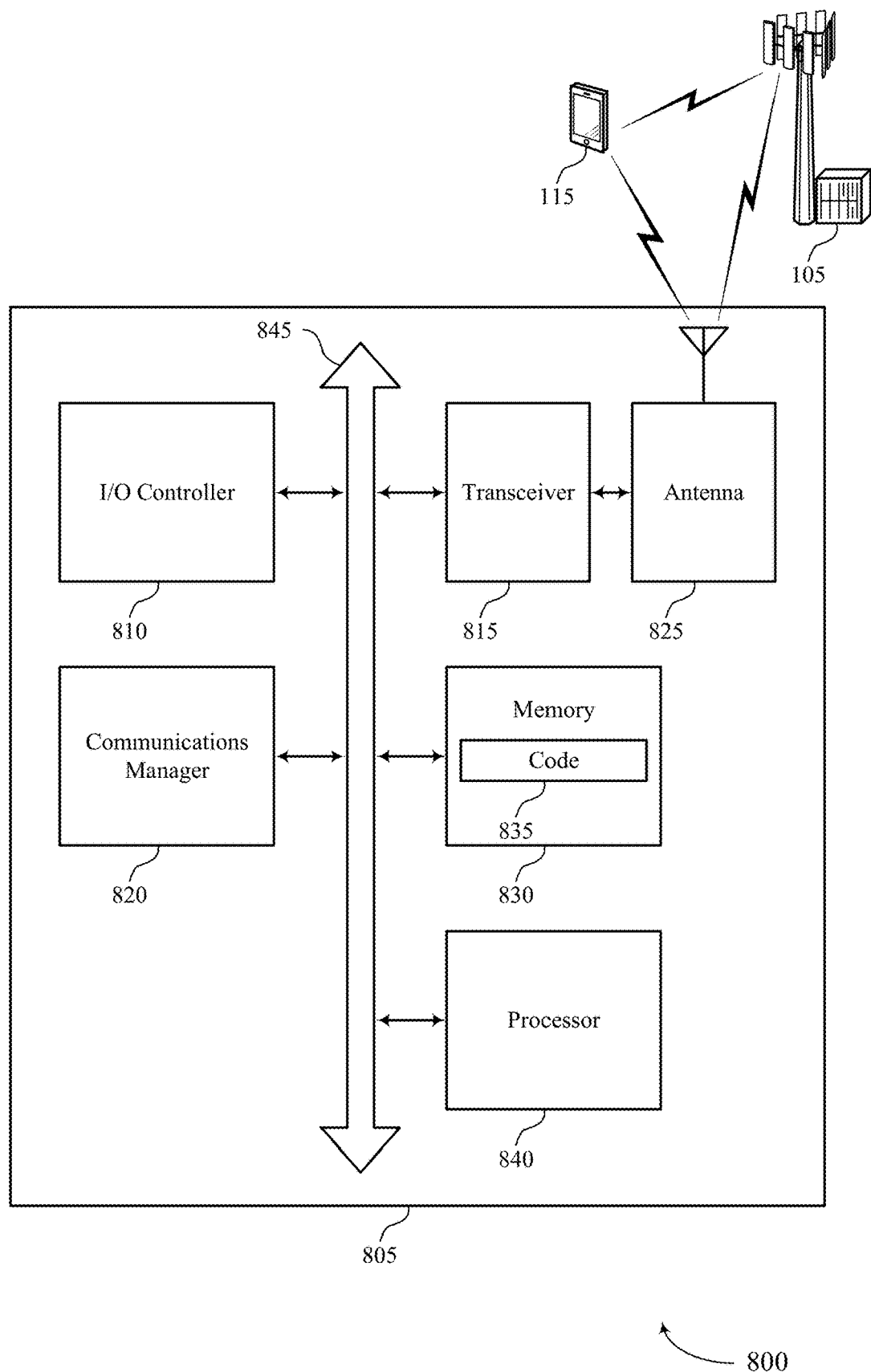
FIG. 8 shows a diagram of a system including a device that supports techniques for activating and deactivating UE relays in accordance with aspects of the present disclosure.

FIG. 8 shows a diagram of a system 800 including a device 805 that supports techniques for activating and deactivating UE relays in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for activating and deactivating UE relays). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving, via a communication link between the first UE and a base station, RRC signaling which configures a relay communication sidelink for communicating message traffic between the first UE and a second UE for relay to the base station. The communications manager 820 may be configured as or otherwise support a means for receiving a control message via L1 signaling or L2 signaling which activates the relay communication sidelink configured by the RRC signaling. The communications manager 820 may be configured as or otherwise support a means for communicating, via the relay communication sidelink, a message for relay to or from the base station based on the control message.

By including or configuring the communications manager 820 in accordance with examples as described herein, the device 805 may support techniques for more efficient configuration and activation of relay communication sidelinks, which may enable more widespread use of relay communication sidelinks between UEs 115. Moreover, by enabling more efficient and widespread use of relay communication sidelinks, techniques described herein may improve link diversity between the UEs 115 and the base station 105, thereby facilitating more reliable wireless communications within the wireless communications system. Further, improved use of relay communication sidelinks may reduce power consumption at the remote UEs 115.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for activating and deactivating UE relays as described herein, or the processor 840 and the memory 830 may be otherwise configured to perform or support such operations.

Figure 9:
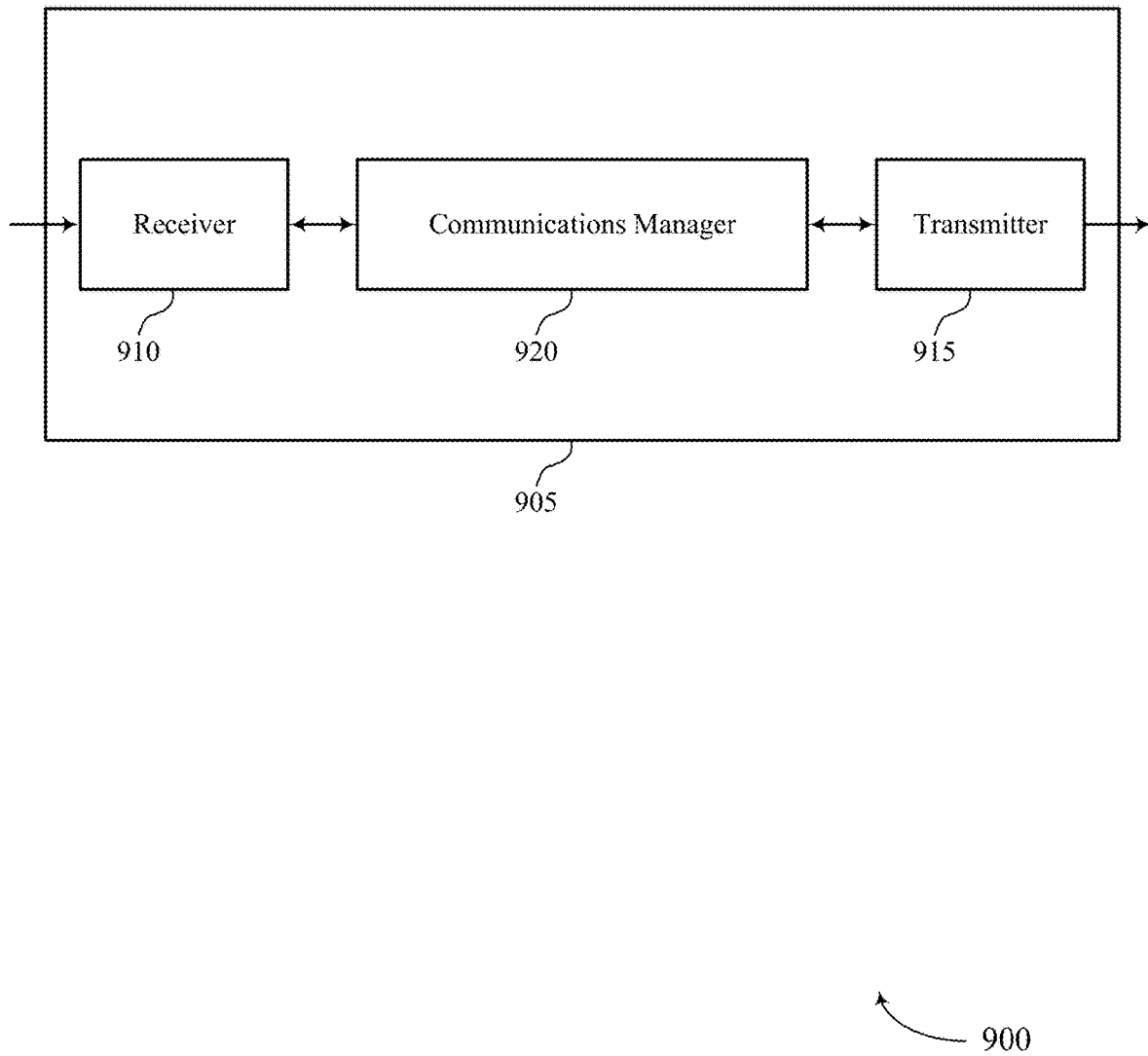
FIGS. 9 and 10 show block diagrams of devices that support techniques for activating and deactivating UE relays in accordance with aspects of the present disclosure.

FIG. 9 shows a block diagram 900 of a device 905 that supports techniques for activating and deactivating UE relays in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for activating and deactivating UE relays). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for activating and deactivating UE relays). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for activating and deactivating UE relays as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, via a communication link between the base station and a first UE, RRC signaling which configures a relay communication sidelink for communicating message traffic between the first UE and a second UE for relay to the base station. The communications manager 920 may be configured as or otherwise support a means for transmitting a control message via L1 signaling or L2 signaling which activates the relay communication sidelink configured by the RRC signaling. The communications manager 920 may be configured as or otherwise support a means for communicating, via the relay communication sidelink, a message for relay to or from one of the first UE or the second UE by the other of the first UE or the second UE based on the control message.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient configuration and activation of relay communication sidelinks, which may enable more widespread use of relay communication sidelinks between UEs 115. Moreover, by enabling more efficient and widespread use of relay communication sidelinks, techniques described herein may improve link diversity between the UEs 115 and the base station 105, thereby facilitating more reliable wireless communications within the wireless communications system. Further, improved use of relay communication sidelinks may reduce power consumption at the remote UEs 115.

Figure 10:
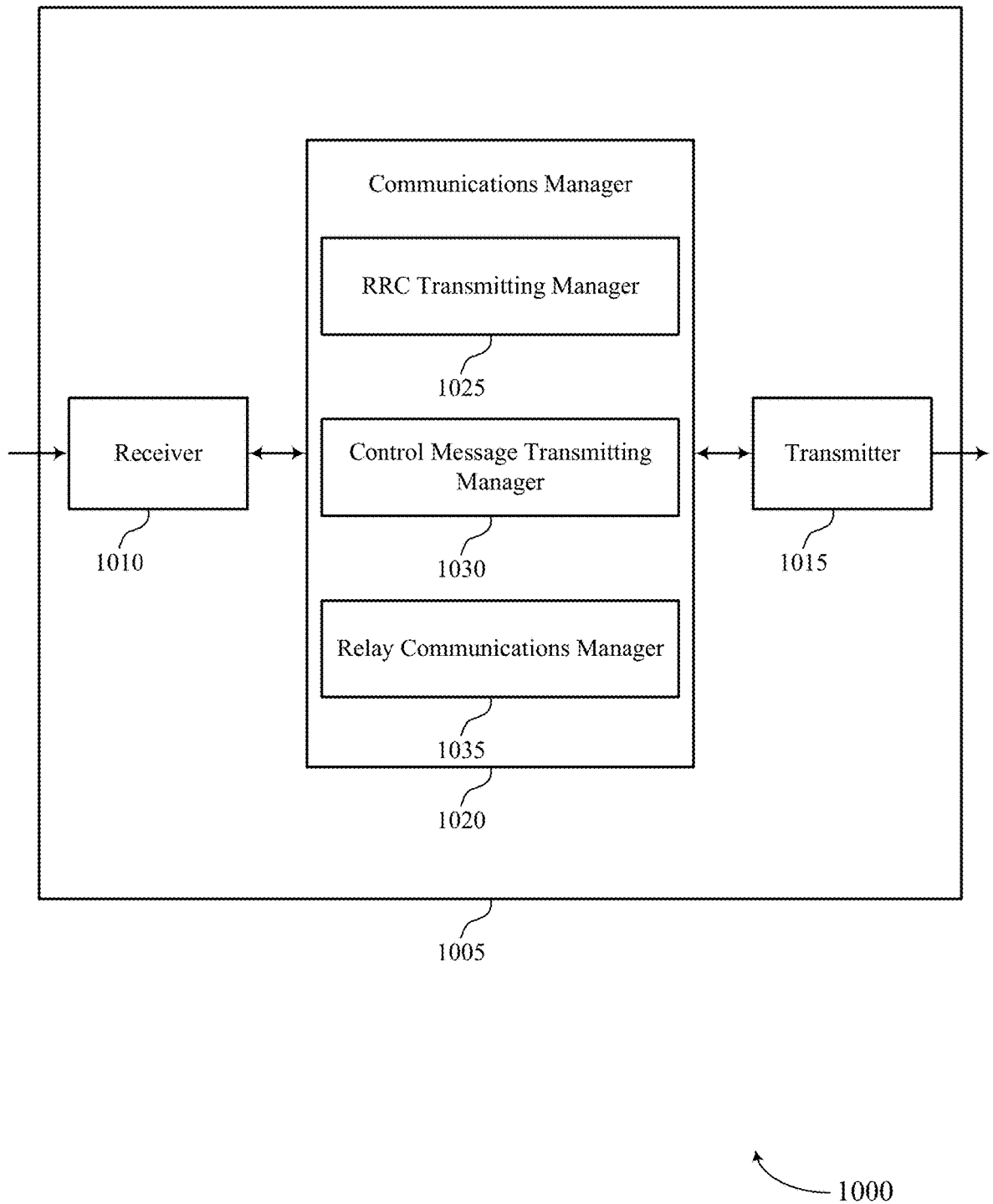

FIG. 10 shows a block diagram 1000 of a device 1005 that supports techniques for activating and deactivating UE relays in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for activating and deactivating UE relays). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for activating and deactivating UE relays). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for activating and deactivating UE relays as described herein. For example, the communications manager 1020 may include an RRC transmitting manager 1025, a control message transmitting manager 1030, a relay communications manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The RRC transmitting manager 1025 may be configured as or otherwise support a means for transmitting, via a communication link between the base station and a first UE, RRC signaling which configures a relay communication sidelink for communicating message traffic between the first UE and a second UE for relay to the base station. The control message transmitting manager 1030 may be configured as or otherwise support a means for transmitting a control message via L1 signaling or L2 signaling which activates the relay communication sidelink configured by the RRC signaling. The relay communications manager 1035 may be configured as or otherwise support a means for communicating, via the relay communication sidelink, a message for relay to or from one of the first UE or the second UE by the other of the first UE or the second UE based on the control message.

Figure 11:
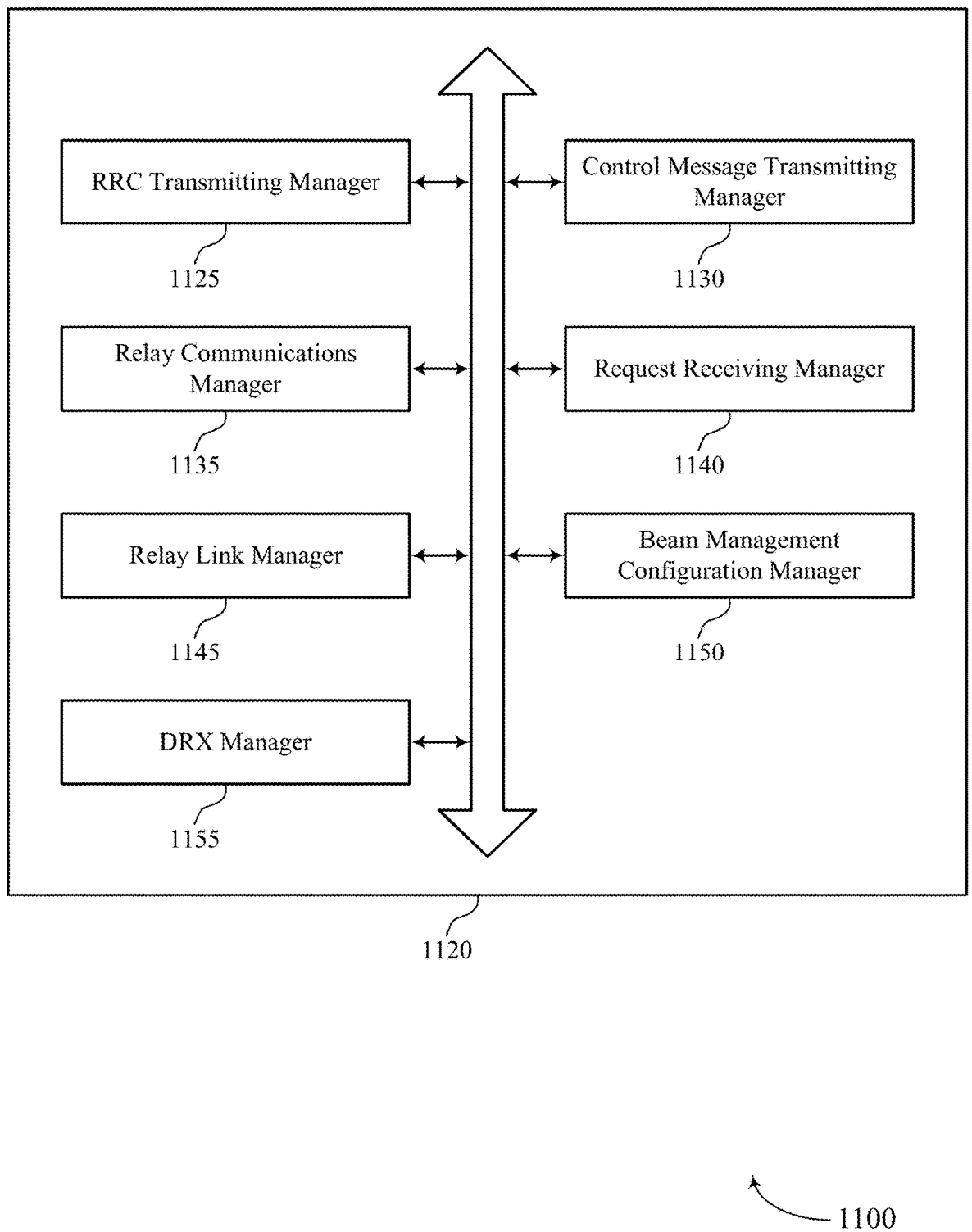
FIG. 11 shows a block diagram of a communications manager that supports techniques for activating and deactivating UE relays in accordance with aspects of the present disclosure.

FIG. 11 shows a block diagram 1100 of a communications manager 1120 that supports techniques for activating and deactivating UE relays in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for activating and deactivating UE relays as described herein. For example, the communications manager 1120 may include an RRC transmitting manager 1125, a control message transmitting manager 1130, a relay communications manager 1135, a request receiving manager 1140, a relay link manager 1145, a beam management configuration manager 1150, a DRX manager 1155, or any combination thereof. Each of these components may communicate, directly or indirectly, with one another (e.g., via one or more buses).

The communications manager 1120 may support wireless communication at a base station in accordance with examples as disclosed herein. The RRC transmitting manager 1125 may be configured as or otherwise support a means for transmitting, via a communication link between the base station and a first UE, RRC signaling which configures a relay communication sidelink for communicating message traffic between the first UE and a second UE for relay to the base station. The control message transmitting manager 1130 may be configured as or otherwise support a means for transmitting a control message via L1 signaling or L2 signaling which activates the relay communication sidelink configured by the RRC signaling. The relay communications manager 1135 may be configured as or otherwise support a means for communicating, via the relay communication sidelink, a message for relay to or from one of the first UE or the second UE by the other of the first UE or the second UE based on the control message.

In some examples, to support transmitting the control message, the control message transmitting manager 1130 may be configured as or otherwise support a means for transmitting the control message that includes a grant allocating a resource on the relay communication sidelink for communicating the message between the first UE and the second UE.

In some examples, the request receiving manager 1140 may be configured as or otherwise support a means for receiving, from the first UE, an activation request to activate the relay communication sidelink, where the RRC signaling, the control message, or both, is transmitted based on receiving the activation request. In some examples, the request receiving manager 1140 may be configured as or otherwise support a means for receiving the activation request based on one or more trigger conditions for activating the relay communication sidelink being satisfied.

In some examples, the RRC transmitting manager 1125 may be configured as or otherwise support a means for transmitting, via the RRC signaling, an indication of the one or more trigger conditions.

In some examples, the request receiving manager 1140 may be configured as or otherwise support a means for receiving, from the first UE, a deactivation request to deactivate the relay communication sidelink. In some examples, the control message transmitting manager 1130 may be configured as or otherwise support a means for transmitting, in response to the deactivation request, a second control message which deactivates the relay communication sidelink.

In some examples, the relay communication sidelink is in an activated state or a deactivated state, and the control message transmitting manager 1130 may be configured as or otherwise support a means for transmitting, via the control message, an indication to transition the relay communication sidelink from the deactivated state to the activated state.

In some examples, the relay link manager 1145 may be configured as or otherwise support a means for determining a first set of parameters associated with the activated state of the relay communication sidelink and a second set of parameters associated with the deactivated state of the relay communication sidelink, where communicating the message via the relay communication sidelink is based on the first set of parameters.

In some examples, the RRC transmitting manager 1125 may be configured as or otherwise support a means for transmitting, via the RRC signaling, an indication of the first set of parameters, the second set of parameters, or both.

In some examples, the relay link manager 1145 may be configured as or otherwise support a means for determining a first set of one or more parameters associated with the communication link between the first UE and the base station, a second set of one or more parameters associated with the first UE, or both. In some examples, the relay link manager 1145 may be configured as or otherwise support a means for determining that one or more trigger conditions for activating or deactivating the relay communication sidelink are satisfied based on the first set of one or more parameters, the second set of one or more parameters, or both. In some examples, the first set of one or more parameters associated with the communication link includes a latency, a throughput, a CQI, or any combination thereof. In some examples, the second set of one or more parameters associated with the first UE includes a power consumption level, a battery level, or both.

In some examples, the beam management configuration manager 1150 may be configured as or otherwise support a means for determining a beam management configuration associated with the relay communication sidelink, where the message is communicated via the relay communication sidelink based on a beam selected in accordance with the beam management configuration.

In some examples, the RRC transmitting manager 1125 may be configured as or otherwise support a means for transmitting, via the RRC signaling, information associated with the beam management configuration, where determining the beam management configuration is based on the RRC signaling. In some examples, the beam management configuration includes a set of one or more parameters for selecting a beam associated with the relay communication sidelink, the set of one or more parameters including a type of beam selection measurements, a frequency of beam selection measurement, one or more parameters for updating TCI states associated with the relay communication sidelink, one or more BFD parameters, one or more BFR parameters, or any combination thereof.

In some examples, the DRX manager 1155 may be configured as or otherwise support a means for determining a DRX configuration associated with the first UE, the second UE, or both, where communicating the message via the relay communication sidelink is based on the identified DRX configuration.

In some examples, the RRC signaling includes the control message.

In some examples, the control message is transmitted via the communication link between the first UE and the base station, via a sidelink communication link between the first UE and the second UE, or both.

Figure 12:
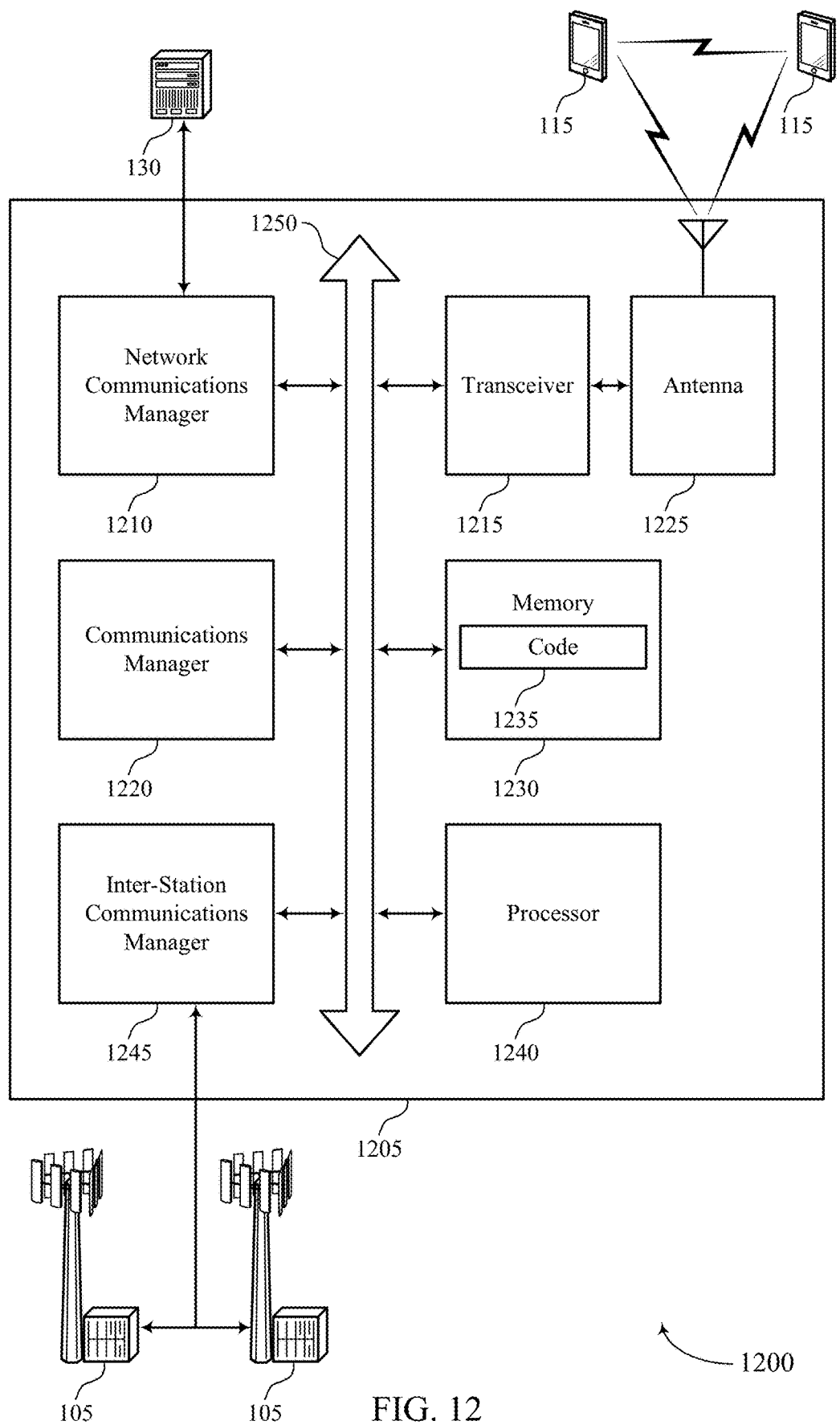
FIG. 12 shows a diagram of a system including a device that supports techniques for activating and deactivating UE relays in accordance with aspects of the present disclosure.

FIG. 12 shows a diagram of a system 1200 including a device 1205 that supports techniques for activating and deactivating UE relays in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for activating and deactivating UE relays). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, via a communication link between the base station and a first UE, RRC signaling which configures a relay communication sidelink for communicating message traffic between the first UE and a second UE for relay to the base station. The communications manager 1220 may be configured as or otherwise support a means for transmitting a control message via L1 signaling or L2 signaling which activates the relay communication sidelink configured by the RRC signaling. The communications manager 1220 may be configured as or otherwise support a means for communicating, via the relay communication sidelink, a message for relay to or from one of the first UE or the second UE by the other of the first UE or the second UE based on the control message.

By including or configuring the communications manager 1220 in accordance with examples as described herein, the device 1205 may support techniques for more efficient configuration and activation of relay communication sidelinks, which may enable more widespread use of relay communication sidelinks between UEs 115. Moreover, by enabling more efficient and widespread use of relay communication sidelinks, techniques described herein may improve link diversity between the UEs 115 and the base station 105, thereby facilitating more reliable wireless communications within the wireless communications system. Further, improved use of relay communication sidelinks may reduce power consumption at the remote UEs 115.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for activating and deactivating UE relays as described herein, or the processor 1240 and the memory 1230 may be otherwise configured to perform or support such operations.

Figure 13:
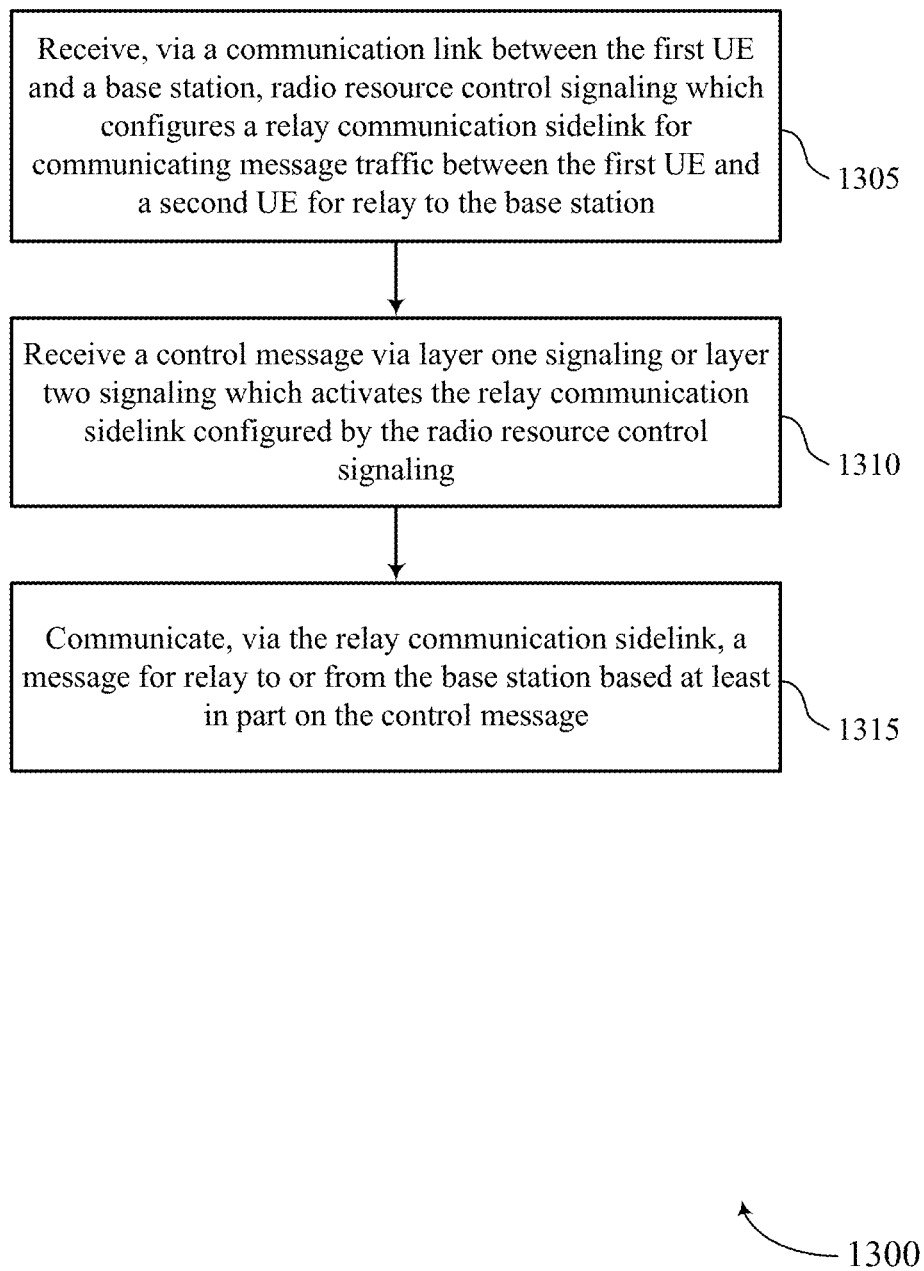
FIGS. 13 through 16 show flowcharts illustrating methods that support techniques for activating and deactivating UE relays in accordance with aspects of the present disclosure.

FIG. 13 shows a flowchart illustrating a method 1300 that supports techniques for activating and deactivating UE relays in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, via a communication link between the first UE and a base station, RRC signaling which configures a relay communication sidelink for communicating message traffic between the first UE and a second UE for relay to the base station. The operations of 1305 may be performed in accordance with examples as disclosed herein. In some examples, aspects of the operations of 1305 may be performed by an RRC receiving manager 725 as described with reference to FIG. 7.

At 1310, the method may include receiving a control message via L1 signaling or L2 signaling which activates the relay communication sidelink configured by the RRC signaling. The operations of 1310 may be performed in accordance with examples as disclosed herein. In some examples, aspects of the operations of 1310 may be performed by a control message receiving manager 730 as described with reference to FIG. 7.

At 1315, the method may include communicating, via the relay communication sidelink, a message for relay to or from the base station based on the control message. The operations of 1315 may be performed in accordance with examples as disclosed herein. In some examples, aspects of the operations of 1315 may be performed by a relay communications manager 735 as described with reference to FIG. 7.

Figure 14:
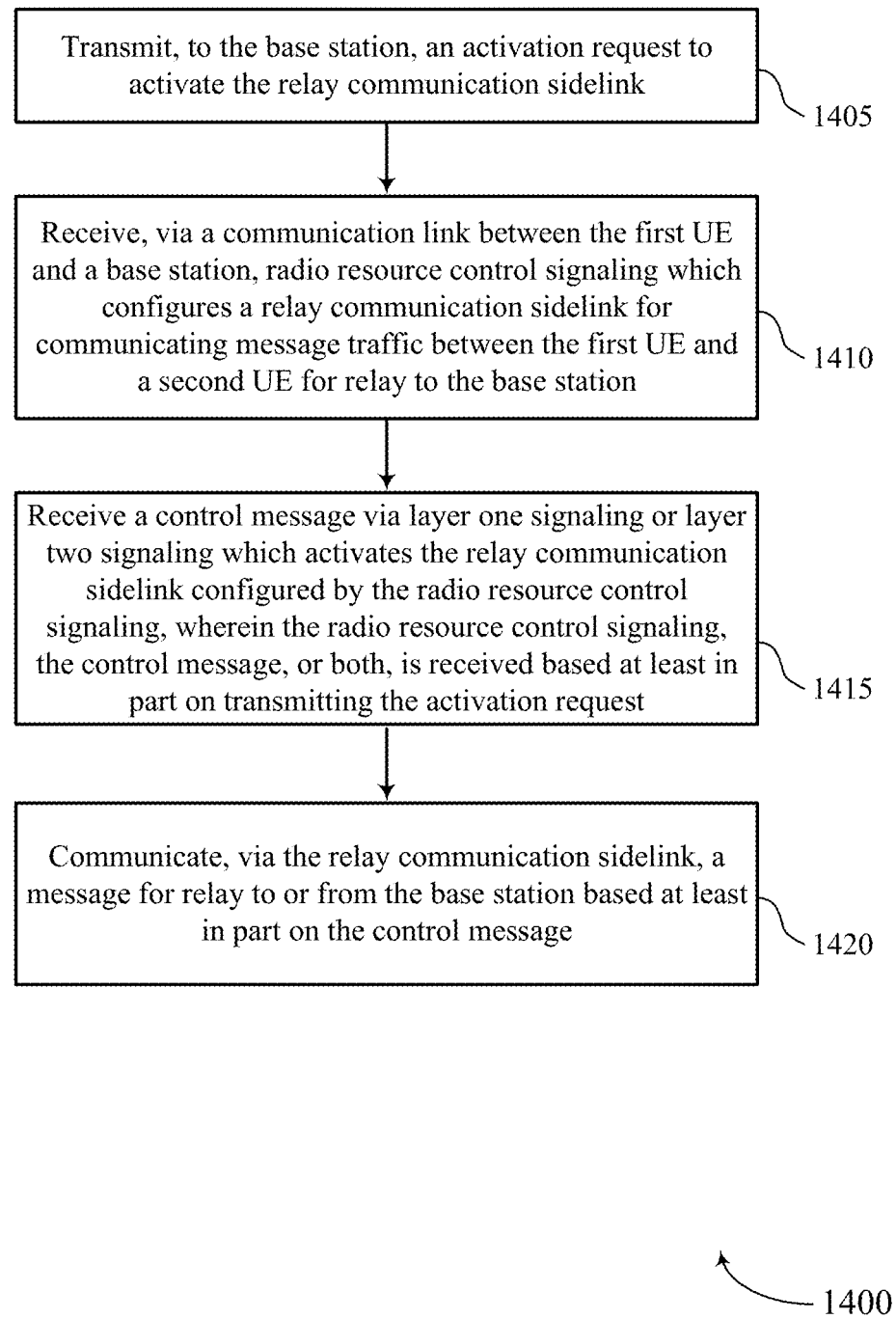

FIG. 14 shows a flowchart illustrating a method 1400 that supports techniques for activating and deactivating UE relays in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to the base station, an activation request to activate the relay communication sidelink. The operations of 1405 may be performed in accordance with examples as disclosed herein. In some examples, aspects of the operations of 1405 may be performed by a request transmitting manager 740 as described with reference to FIG. 7.

At 1410, the method may include receiving, via a communication link between the first UE and a base station, RRC signaling which configures a relay communication sidelink for communicating message traffic between the first UE and a second UE for relay to the base station. The operations of 1410 may be performed in accordance with examples as disclosed herein. In some examples, aspects of the operations of 1410 may be performed by an RRC receiving manager 725 as described with reference to FIG. 7.

At 1415, the method may include receiving a control message via L1 signaling or L2 signaling which activates the relay communication sidelink configured by the RRC signaling. The operations of 1415 may be performed in accordance with examples as disclosed herein, where the RRC signaling, the control message, or both, is received based on transmitting the activation request. In some examples, aspects of the operations of 1415 may be performed by a control message receiving manager 730 as described with reference to FIG. 7.

At 1420, the method may include communicating, via the relay communication sidelink, a message for relay to or from the base station based on the control message. The operations of 1420 may be performed in accordance with examples as disclosed herein. In some examples, aspects of the operations of 1420 may be performed by a relay communications manager 735 as described with reference to FIG. 7.

Figure 15:
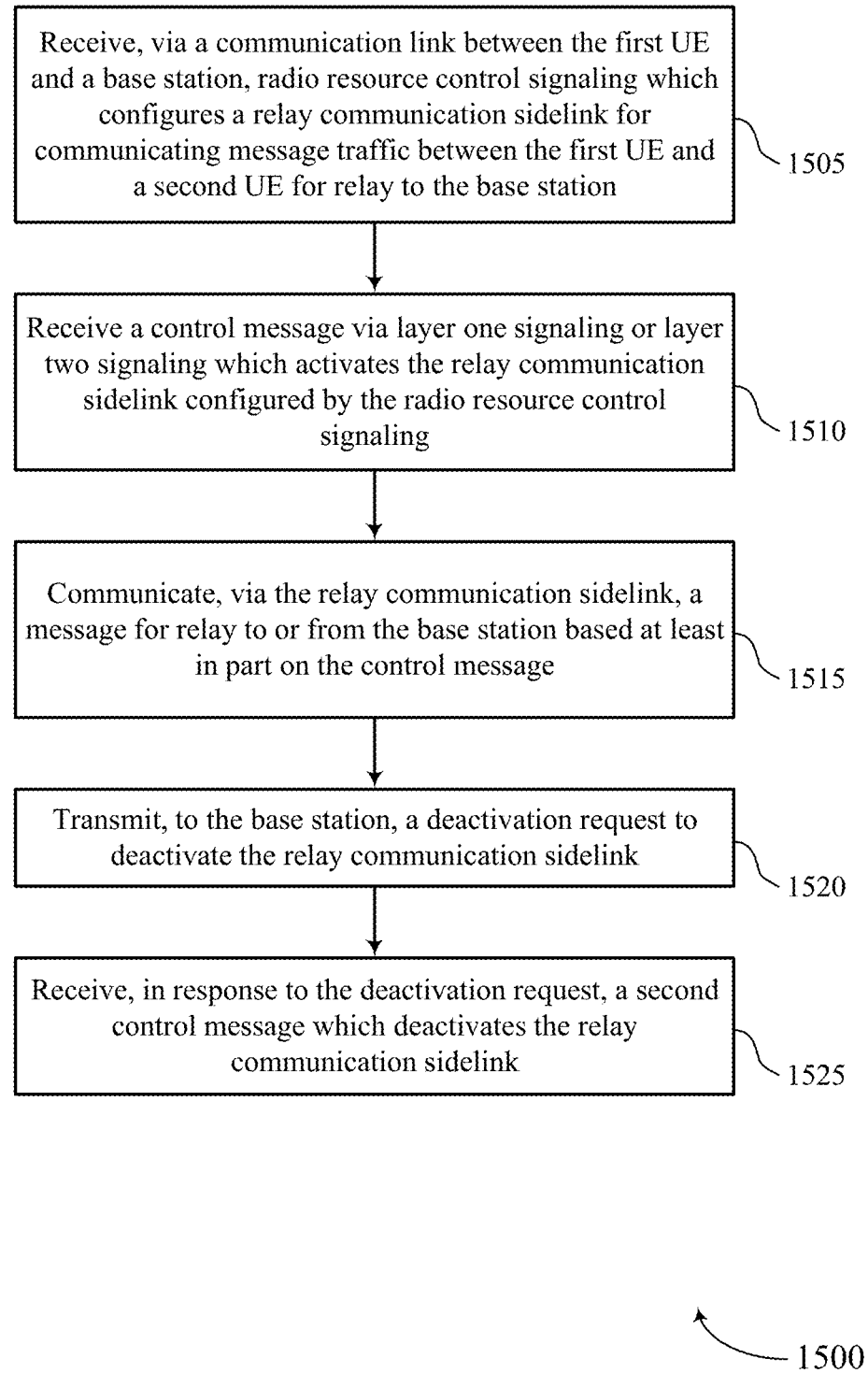

FIG. 15 shows a flowchart illustrating a method 1500 that supports techniques for activating and deactivating UE relays in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, via a communication link between the first UE and a base station, RRC signaling which configures a relay communication sidelink for communicating message traffic between the first UE and a second UE for relay to the base station. The operations of 1505 may be performed in accordance with examples as disclosed herein. In some examples, aspects of the operations of 1505 may be performed by an RRC receiving manager 725 as described with reference to FIG. 7.

At 1510, the method may include receiving a control message via L1 signaling or L2 signaling which activates the relay communication sidelink configured by the RRC signaling. The operations of 1510 may be performed in accordance with examples as disclosed herein. In some examples, aspects of the operations of 1510 may be performed by a control message receiving manager 730 as described with reference to FIG. 7.

At 1515, the method may include communicating, via the relay communication sidelink, a message for relay to or from the base station based on the control message. The operations of 1515 may be performed in accordance with examples as disclosed herein. In some examples, aspects of the operations of 1515 may be performed by a relay communications manager 735 as described with reference to FIG. 7.

At 1520, the method may include transmitting, to the base station, a deactivation request to deactivate the relay communication sidelink. The operations of 1520 may be performed in accordance with examples as disclosed herein. In some examples, aspects of the operations of 1520 may be performed by a request transmitting manager 740 as described with reference to FIG. 7.

At 1525, the method may include receiving, in response to the deactivation request, a second control message which deactivates the relay communication sidelink. The operations of 1525 may be performed in accordance with examples as disclosed herein. In some examples, aspects of the operations of 1525 may be performed by a control message receiving manager 730 as described with reference to FIG. 7.

Figure 16:
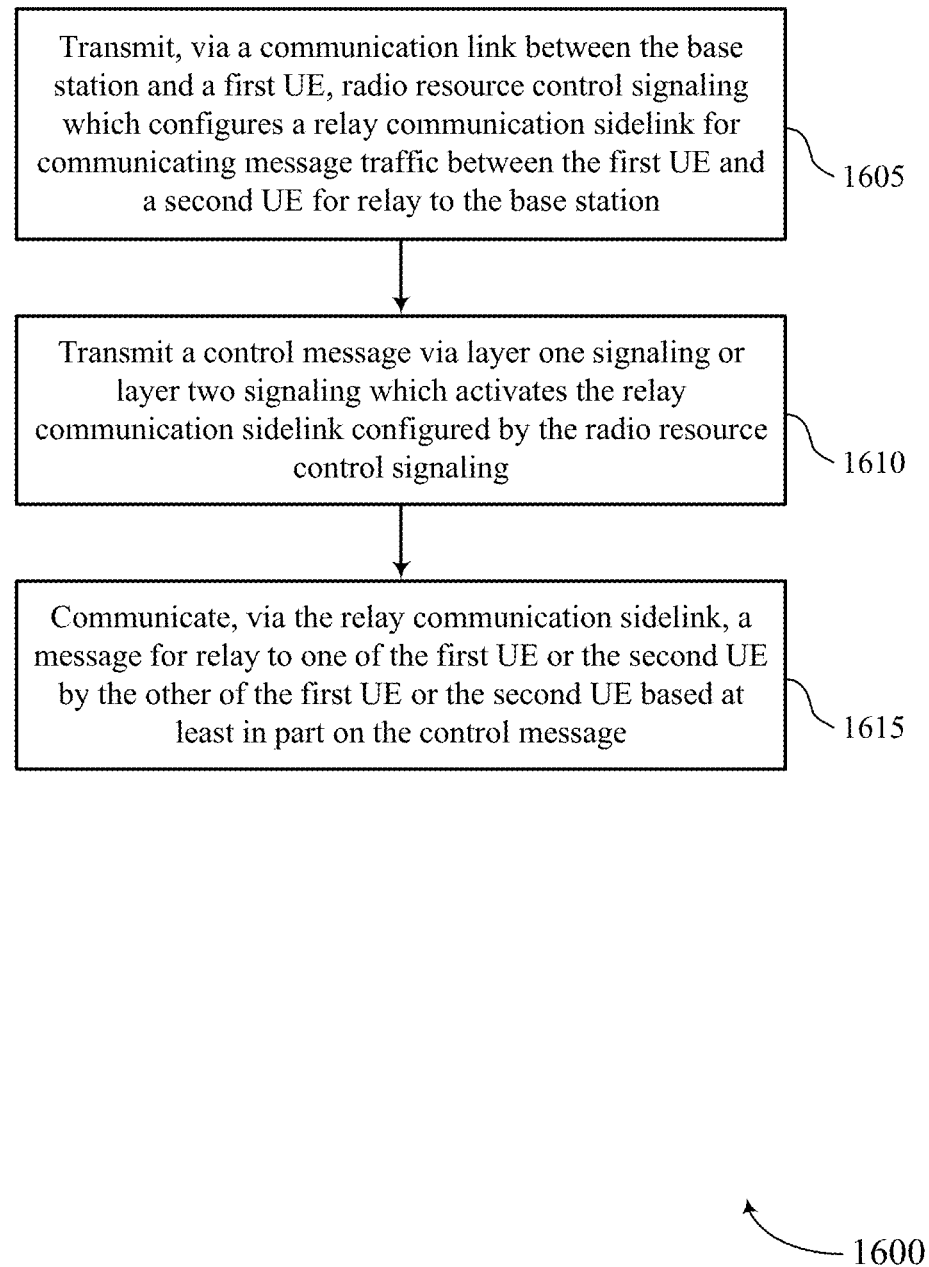

FIG. 16 shows a flowchart illustrating a method 1600 that supports techniques for activating and deactivating UE relays in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, via a communication link between the base station and a first UE, RRC signaling which configures a relay communication sidelink for communicating message traffic between the first UE and a second UE for relay to the base station. The operations of 1605 may be performed in accordance with examples as disclosed herein. In some examples, aspects of the operations of 1605 may be performed by an RRC transmitting manager 1125 as described with reference to FIG. 11.

At 1610, the method may include transmitting a control message via L1 signaling or L2 signaling which activates the relay communication sidelink configured by the RRC signaling. The operations of 1610 may be performed in accordance with examples as disclosed herein. In some examples, aspects of the operations of 1610 may be performed by a control message transmitting manager 1130 as described with reference to FIG. 11.

At 1615, the method may include communicating, via the relay communication sidelink, a message for relay to or from one of the first UE or the second UE by the other of the first UE or the second UE based on the control message. The operations of 1615 may be performed in accordance with examples as disclosed herein. In some examples, aspects of the operations of 1615 may be performed by a relay communications manager 1135 as described with reference to FIG. 11.

The following provides an overview of aspects of the present disclosure:

Aspect 1: A method for wireless communication at a first UE, comprising: receiving, via a communication link between the first UE and a base station, RRC signaling which configures a relay communication sidelink for communicating message traffic between the first UE and a second UE for relay to the base station; receiving a control message via L1 signaling or L2 signaling which activates the relay communication sidelink configured by the RRC signaling; and communicating, via the relay communication sidelink, a message for relay to or from the base station based at least in part on the control message.

Aspect 2: The method of aspect 1, wherein receiving the control message comprises: receiving the control message that comprises a grant allocating a resource on the relay communication sidelink for communicating the message between the first UE and the second UE.

Aspect 3: The method of any of aspects 1 through 2, further comprising: transmitting, to the base station, an activation request to activate the relay communication sidelink, wherein the RRC signaling, the control message, or both, is received based at least in part on transmitting the activation request.

Aspect 4: The method of aspect 3, further comprising: transmitting the activation request based at least in part on one or more trigger conditions for activating the relay communication sidelink being satisfied.

Aspect 5: The method of aspect 4, further comprising: receiving, via the RRC signaling, an indication of the one or more trigger conditions.

Aspect 6: The method of any of aspects 1 through 5, further comprising: transmitting, to the base station, a deactivation request to deactivate the relay communication sidelink; and receiving, in response to the deactivation request, a second control message which deactivates the relay communication sidelink.

Aspect 7: The method of any of aspects 1 through 6, wherein the relay communication sidelink is in a deactivated state, the method further comprising: receiving, via the control message, an indication to transition the relay communication sidelink from the deactivated state to an activated state.

Aspect 8: The method of aspect 7, further comprising: determining a first set of parameters associated with the activated state of the relay communication sidelink and a second set of parameters associated with the deactivated state of the relay communication sidelink, wherein communicating the message via the relay communication sidelink is based at least in part on the first set of parameters.

Aspect 9: The method of aspect 8, further comprising: receiving, via the RRC signaling, an indication of the first set of parameters, the second set of parameters, or both.

Aspect 10: The method of any of aspects 1 through 9, further comprising: determining a first set of one or more parameters associated with the communication link between the first UE and the base station, a second set of one or more parameters associated with the first UE, or both; and determining that one or more trigger conditions for activating or deactivating the relay communication sidelink are satisfied based at least in part on the first set of one or more parameters, the second set of one or more parameters, or both.

Aspect 11: The method of aspect 10, wherein the first set of one or more parameters associated with the communication link comprises a latency, a throughput, a CQI, or any combination thereof, and wherein the second set of one or more parameters associated with the first UE comprises a power consumption level, a battery level, or both Aspect 12: The method of any of aspects 1 through 11, further comprising: determining a beam management configuration associated with the relay communication sidelink, wherein the message is communicated via the relay communication sidelink based at least in part on a beam selected in accordance with the beam management configuration.

Aspect 13: The method of aspect 12, further comprising: receiving, via the RRC signaling, information associated with the beam management configuration, wherein determining the beam management configuration is based at least in part on the RRC signaling.

Aspect 14: The method of any of aspects 12 through 13, wherein the beam management configuration comprises a set of one or more parameters for selecting a beam associated with the relay communication sidelink, the set of one or more parameters comprising a type of beam selection measurements, a frequency of beam selection measurement, one or more parameters for updating TCI states associated with the relay communication sidelink, one or more BFD parameters, one or more BFR parameters, or any combination thereof.

Aspect 15: The method of any of aspects 1 through 14, further comprising: determining a DRX configuration associated with the first UE, the second UE, or both, wherein communicating the message via the relay communication sidelink is based at least in part on the identified DRX configuration.

Aspect 16: The method of any of aspects 1 through 15, wherein the RRC signaling comprises the control message.

Aspect 17: The method of any of aspects 1 through 16, further comprising: communicating a second message via a sidelink communication link between the first UE and the second UE, wherein the sidelink communication link is different from the relay communication sidelink.

Aspect 18: The method of any of aspects 1 through 17, wherein the control message is received via the communication link between the first UE and the base station, via a sidelink communication link between the first UE and the second UE, or both.

Aspect 19: The method of any of aspects 1 through 18, wherein the second UE comprises a relay UE, and wherein communicating the message via the relay communication sidelink comprises: receiving the message relayed to the first UE by the second UE via the relay communication sidelink, or transmitting the message to the second UE via the relay communication sidelink for relay to the base station.

Aspect 20: The method of any of aspects 1 through 19, wherein the first UE comprises a relay UE, and wherein communicating the message via the relay communication sidelink comprises: receiving the message from the base station and relaying the message received from the base station to the second UE via the relay communication sidelink, or receiving the message from the second UE via the relay communication sidelink and relaying the message to the base station.

Aspect 21: A method for wireless communication at a base station, comprising: transmitting, via a communication link between the base station and a first UE, RRC signaling which configures a relay communication sidelink for communicating message traffic between the first UE and a second UE for relay to the base station; transmitting a control message via L1 signaling or L2 signaling which activates the relay communication sidelink configured by the RRC signaling; and communicating, via the relay communication sidelink, a message for relay to or from one of the first UE or the second UE by the other of the first UE or the second UE based at least in part on the control message.

Aspect 22: The method of aspect 21, wherein transmitting the control message comprises: transmitting the control message that comprises a grant allocating a resource on the relay communication sidelink for communicating the message between the first UE and the second UE.

Aspect 23: The method of any of aspects 21 through 22, further comprising: receiving, from the first UE, an activation request to activate the relay communication sidelink, wherein the RRC signaling, the control message, or both, is transmitted based at least in part on receiving the activation request.

Aspect 24: The method of aspect 23, further comprising: receiving the activation request based at least in part on one or more trigger conditions for activating the relay communication sidelink being satisfied.

Aspect 25: The method of aspect 24, further comprising: transmitting, via the RRC signaling, an indication of the one or more trigger conditions.

Aspect 26: The method of any of aspects 21 through 25, further comprising: receiving, from the first UE, a deactivation request to deactivate the relay communication sidelink; and transmitting, in response to the deactivation request, a second control message which deactivates the relay communication sidelink.

Aspect 27: The method of any of aspects 21 through 26, wherein the relay communication sidelink is in a deactivated state, the method further comprising: transmitting, via the control message, an indication to transition the relay communication sidelink from the deactivated state to an activated state.

Aspect 28: The method of aspect 27, further comprising: determining a first set of parameters associated with the activated state of the relay communication sidelink and a second set of parameters associated with the deactivated state of the relay communication sidelink, wherein communicating the message via the relay communication sidelink is based at least in part on the first set of parameters.

Aspect 29: The method of aspect 28, further comprising: transmitting, via the RRC signaling, an indication of the first set of parameters, the second set of parameters, or both.

Aspect 30: The method of any of aspects 21 through 29, further comprising: determining a first set of one or more parameters associated with the communication link between the first UE and the base station, a second set of one or more parameters associated with the first UE, or both; and determining that one or more trigger conditions for activating or deactivating the relay communication sidelink are satisfied based at least in part on the first set of one or more parameters, the second set of one or more parameters, or both.

Aspect 31: The method of aspect 30, wherein the first set of one or more parameters associated with the communication link comprises a latency, a throughput, a CQI, or any combination thereof, and wherein the second set of one or more parameters associated with the first UE comprises a power consumption level, a battery level, or both Aspect 32: The method of any of aspects 21 through 31, further comprising: determining a beam management configuration associated with the relay communication sidelink, wherein the message is communicated via the relay communication sidelink based at least in part on a beam selected in accordance with the beam management configuration.

Aspect 33: The method of aspect 32, further comprising: transmitting, via the RRC signaling, information associated with the beam management configuration, wherein determining the beam management configuration is based at least in part on the RRC signaling.

Aspect 34: The method of any of aspects 32 through 33, wherein the beam management configuration comprises a set of one or more parameters for selecting a beam associated with the relay communication sidelink, the set of one or more parameters comprising a type of beam selection measurements, a frequency of beam selection measurement, one or more parameters for updating TCI states associated with the relay communication sidelink, one or more BFD parameters, one or more BFR parameters, or any combination thereof.

Aspect 35: The method of any of aspects 21 through 34, further comprising: determining a DRX configuration associated with the first UE, the second UE, or both, wherein communicating the message via the relay communication sidelink is based at least in part on the identified DRX configuration.

Aspect 36: The method of any of aspects 21 through 35, wherein the RRC signaling comprises the control message.

Aspect 37: The method of any of aspects 21 through 36, wherein the control message is transmitted via the communication link between the first UE and the base station, via a sidelink communication link between the first UE and the second UE, or both.

Aspect 38: An apparatus for wireless communication at a first UE, comprising a processor; memory coupled with the processor; and instructions stored in the memory and executable by the processor to cause the apparatus to perform a method of any of aspects 1 through 20.

Aspect 39: An apparatus for wireless communication at a first UE, comprising at least one means for performing a method of any of aspects 1 through 20.

Aspect 40: A non-transitory computer-readable medium storing code for wireless communication at a first UE, the code comprising instructions executable by a processor to perform a method of any of aspects 1 through 20.

Aspect 41: An apparatus for wireless communication at a base station, comprising a processor; memory coupled with the processor; and instructions stored in the memory and executable by the processor to cause the apparatus to perform a method of any of aspects 21 through 37.

Aspect 42: An apparatus for wireless communication at a base station, comprising at least one means for performing a method of any of aspects 21 through 37.

Aspect 43: A non-transitory computer-readable medium storing code for wireless communication at a base station, the code comprising instructions executable by a processor to perform a method of any of aspects 21 through 37.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
 a processor;
 memory coupled with the processor; and
 instructions stored in the memory and executable by the processor to cause the apparatus to:
  receive, via a communication link between the first UE and a network node, radio resource control signaling which configures a relay communication sidelink for communicating message traffic between the first UE, a second UE, and the network node;
  determine a beam management configuration associated with the relay communication sidelink, wherein the beam management configuration comprises a set of one or more parameters for selecting a beam associated with the relay communication sidelink, the set of one or more parameters comprising a frequency of beam selection measurement, one or more beam failure recovery parameters, or any combination thereof;

receive a control message via layer one signaling or layer two signaling which activates the relay communication sidelink configured by the radio resource control signaling; and communicate, via the relay communication sidelink, a message for relay to or from the network node based at least in part on the control message, wherein the message is communicated via the relay communication sidelink based at least in part on the beam selected in accordance with the beam management configuration.

2. The apparatus of claim 1, wherein the instructions to receive the control message are executable by the processor to cause the apparatus to:
receive, via the control message, a grant allocating a resource on the relay communication sidelink for communicating the message between the first UE and the second UE.

3. The apparatus of claim 1, wherein the instructions are further executable by the processor to cause the apparatus to:
transmit, to the network node, an activation request to activate the relay communication sidelink, wherein the radio resource control signaling, the control message, or both, is received based at least in part on transmitting the activation request.

4. The apparatus of claim 3, wherein the instructions are further executable by the processor to cause the apparatus to:
transmit the activation request based at least in part on one or more trigger conditions for activating the relay communication sidelink being satisfied.

5. The apparatus of claim 4, wherein the instructions are further executable by the processor to cause the apparatus to:
receive, via the radio resource control signaling, an indication of the one or more trigger conditions.

6. The apparatus of claim 1, wherein the instructions are further executable by the processor to cause the apparatus to:
transmit, to the network node, a deactivation request to deactivate the relay communication sidelink; and
receive, in response to the deactivation request, a second control message which deactivates the relay communication sidelink.

7. The apparatus of claim 1, wherein the relay communication sidelink is in a deactivated state, and the instructions are further executable by the processor to cause the apparatus to:
receive, via the control message, an indication to transition the relay communication sidelink from the deactivated state to an activated state.

8. The apparatus of claim 7, wherein the instructions are further executable by the processor to cause the apparatus to:
determine a first set of parameters associated with the activated state of the relay communication sidelink and a second set of parameters associated with the deactivated state of the relay communication sidelink, wherein communicating the message via the relay communication sidelink is based at least in part on the first set of parameters.

9. The apparatus of claim 8, wherein the instructions are further executable by the processor to cause the apparatus to:
receive, via the radio resource control signaling, an indication of the first set of parameters, the second set of parameters, or both.

10. The apparatus of claim 1, wherein the instructions are further executable by the processor to cause the apparatus to:
determine a first set of one or more parameters associated with the communication link between the first UE and the network node, a second set of one or more parameters associated with the first UE, or both; and
determine that one or more trigger conditions for activating or deactivating the relay communication sidelink are satisfied based at least in part on the first set of one or more parameters, the second set of one or more parameters, or both.

11. The apparatus of claim 10, wherein the first set of one or more parameters associated with the communication link comprises a latency, a throughput, a channel quality indicator, or any combination thereof, and wherein the second set of one or more parameters associated with the first UE comprises a power consumption level, a battery level, or both.

12. The apparatus of claim 1, wherein the instructions are further executable by the processor to cause the apparatus to:
receive, via the radio resource control signaling, information associated with the beam management configuration, wherein determining the beam management configuration is based at least in part on the radio resource control signaling.

13. The apparatus of claim 1, wherein the set of one or more parameters associated with the beam management configuration further comprise a type of beam selection measurements, one or more parameters for updating transmission-configuration indicator states associated with the relay communication sidelink, one or more bidirectional forward detection parameters, or any combination thereof.

14. The apparatus of claim 1, wherein the instructions are further executable by the processor to cause the apparatus to:
determine a discontinuous reception configuration associated with the first UE, the second UE, or both, wherein communicating the message via the relay communication sidelink is based at least in part on the discontinuous reception configuration.

15. The apparatus of claim 1, wherein the instructions are further executable by the processor to cause the apparatus to:
communicate a second message via a sidelink communication link between the first UE and the second UE, wherein the sidelink communication link is different from the relay communication sidelink.

16. The apparatus of claim 1, wherein the control message is received via the communication link between the first UE and the network node, via a sidelink communication link between the first UE and the second UE, or both.

17. The apparatus of claim 1, wherein the instructions to communicate the message via the relay communication sidelink are executable by the processor to cause the apparatus to:
receive the message relayed to the first UE by the second UE via the relay communication sidelink, or transmit the message to the second UE via the relay communication sidelink for relay to the network node.

18. The apparatus of claim 1, wherein the instructions to communicate the message via the relay communication sidelink are executable by the processor to cause the apparatus to:
receive the message from the network node and relay the message to the second UE via the relay communication sidelink, or receive the message from the second UE via the relay communication sidelink and relay the message to the network node.

19. An apparatus for wireless communication at a network node, comprising:
a processor;
memory coupled with the processor; and
instructions stored in the memory and executable by the processor to cause the apparatus to:
transmit, via a communication link between the network node and a first user equipment (UE), radio resource control signaling which configures a relay communication sidelink for communicating message traffic between the first UE, a second UE, and the network node, the radio resource control signaling indicating a beam management configuration comprising a set of one or more parameters usable by the first UE, the second UE, or both, for selecting a beam associated with the relay communication sidelink, the set of one or more parameters comprising a frequency of beam selection measurement, one or more beam failure recovery parameters, or any combination thereof;
transmit a control message via layer one signaling or layer two signaling which activates the relay communication sidelink configured by the radio resource control signaling; and
communicate, via the relay communication sidelink, a message for relay to or from one of the first UE or the second UE by the other of the first UE or the second UE based at least in part on the control message, and based at least in part on the beam management configuration.

20. The apparatus of claim 19, wherein the instructions to transmit the control message are executable by the processor to cause the apparatus to:
transmit, via the control message, a grant allocating a resource on the relay communication sidelink for communicating the message between the first UE and the second UE.

21. The apparatus of claim 19, wherein the instructions are further executable by the processor to cause the apparatus to:
receive, from the first UE, an activation request to activate the relay communication sidelink, wherein the radio resource control signaling, the control message, or both, is transmitted based at least in part on receiving the activation request.

22. The apparatus of claim 21, wherein the instructions are further executable by the processor to cause the apparatus to:
receive the activation request based at least in part on one or more trigger conditions for activating the relay communication sidelink being satisfied.

23. The apparatus of claim 22, wherein the instructions are further executable by the processor to cause the apparatus to:
transmit, via the radio resource control signaling, an indication of the one or more trigger conditions.

24. The apparatus of claim 19, wherein the instructions are further executable by the processor to cause the apparatus to:
receive, from the first UE, a deactivation request to deactivate the relay communication sidelink; and
transmit, in response to the deactivation request, a second control message which deactivates the relay communication sidelink.

25. The apparatus of claim 19, wherein the relay communication sidelink is in a deactivated state, and the instructions are further executable by the processor to cause the apparatus to:
transmit, via the control message, an indication to transition the relay communication sidelink from the deactivated state to an activated state.

26. The apparatus of claim 25, wherein the instructions are further executable by the processor to cause the apparatus to:
determine a first set of parameters associated with the activated state of the relay communication sidelink and a second set of parameters associated with the deactivated state of the relay communication sidelink, wherein communicating the message via the relay communication sidelink is based at least in part on the first set of parameters.

27. The apparatus of claim 19, wherein the instructions are further executable by the processor to cause the apparatus to:
determine a first set of one or more parameters associated with the communication link between the network node and the first UE, a second set of one or more parameters associated with the first UE, or both; and
determine that one or more trigger conditions for activating or deactivating the relay communication sidelink are satisfied based at least in part on the first set of one or more parameters, the second set of one or more parameters, or both.

28. The apparatus of claim 27, wherein the first set of one or more parameters associated with the communication link comprises a latency, a throughput, a channel quality indicator, or any combination thereof, and wherein the second set of one or more parameters associated with the first UE comprises a power consumption level, a battery level, or both.

29. A method for wireless communication at a first user equipment (UE), comprising:
receiving, via a communication link between the first UE and a network node, radio resource control signaling which configures a relay communication sidelink for communicating message traffic between the first UE, a second UE, and the network node;
determining a beam management configuration associated with the relay communication sidelink, wherein the beam management configuration comprises a set of one or more parameters for selecting a beam associated with the relay communication sidelink, the set of one or more parameters comprising a frequency of beam selection measurement, one or more beam failure recovery parameters, or any combination thereof;
receiving a control message via layer one signaling or layer two signaling which activates the relay communication sidelink configured by the radio resource control signaling; and
communicating, via the relay communication sidelink, a message for relay to or from the network node based at least in part on the control message, wherein communicating the message via the relay communication sidelink is based at least in part on the beam selected in accordance with the beam management configuration.

30. A method for wireless communication at a network node, comprising:
transmitting, via a communication link between the network node and a first user equipment (UE), radio resource control signaling which configures a relay communication sidelink for communicating message traffic between the first UE, a second UE, and the network node, the radio resource control signaling indicating a beam management configuration comprising a set of one or more parameters usable by the first UE, the second UE, or both, for selecting a beam associated with the relay communication sidelink, the set of one or more parameters comprising a frequency of beam selection measurement, one or more beam failure recovery parameters, or any combination thereof;

transmitting a control message via layer one signaling or layer two signaling which activates the relay communication sidelink configured by the radio resource control signaling; and communicating, via the relay communication sidelink, a message for relay to or from one of the first UE or the second UE by the other of the first UE or the second UE based at least in part on the control message, and based at least in part on the beam management configuration.

* * * * *